(12) United States Patent
Martin et al.

(10) Patent No.: US 11,360,240 B2
(45) Date of Patent: Jun. 14, 2022

(54) CONTACT LENS CONTAINING PHOTOSENSITIVE CHROMOPHORE AND PACKAGE THEREFOR

(71) Applicant: Johnson & Johnson Vision Care, Inc., Jacksonville, FL (US)

(72) Inventors: Patricia Martin, Jacksonville, FL (US); Shivkumar Mahadevan, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 16/952,841

(22) Filed: Nov. 19, 2020

(65) Prior Publication Data

US 2021/0190992 A1 Jun. 24, 2021

Related U.S. Application Data

(60) Provisional application No. 62/950,577, filed on Dec. 19, 2019.

(51) Int. Cl.
  *G02B 1/04* (2006.01)
  *G02C 7/10* (2006.01)
  *C09B 62/00* (2006.01)

(52) U.S. Cl.
  CPC .............. *G02B 1/043* (2013.01); *C09B 62/00* (2013.01); *G02C 7/102* (2013.01)

(58) Field of Classification Search
  CPC ........ G02B 1/043; G02B 7/102; C09B 62/00; C09B 62/0025; C09B 62/0265; C09B 62/322; C09B 7/10; C09B 7/06; C09B 29/0011; C09B 29/0007; C09B 29/0003; C08L 2666/70; C08L 2666/66; A45C 11/005; G02C 7/022; G02C 7/021; G02C 7/04; G02C 7/02
  USPC .......................... 351/159.02, 159.24, 159.29, 351/159.3–159.32
  See application file for complete search history.

(56) References Cited

U.S. PATENT DOCUMENTS

| 3,408,429 A | 10/1968 | Wichterle |
| 3,660,545 A | 5/1972 | Wichterle |
| 3,808,178 A | 4/1974 | Gaylord |
| 4,113,224 A | 9/1978 | Clark et al. |

(Continued)

FOREIGN PATENT DOCUMENTS

| EP | 0080539 B1 | 6/1983 |
| WO | 2003022321 A2 | 3/2003 |
| WO | 2008061992 A2 | 5/2008 |

OTHER PUBLICATIONS

Compendium of Polymer Terminology and Nomenclature: IUPAC Recommendations 2008, edited by: Richard G. Jones, Jaroslav Kahovec, Robert Stepto, Edward S. Wilks, Michael Hess, Tatsuki Kitayama, and W. Val Metanomski.

(Continued)

*Primary Examiner* — Travis S Fissel
(74) *Attorney, Agent, or Firm* — Raef M. Shaltout

(57) ABSTRACT

Provided is a contact lens system that comprises: a contact lens containing a photosensitive chromophore and a package surrounding the contact lens. The photosensitive chromophore has at least one active wavelength between 250 and 400 nanometers and at least one active wavelength between 400 and 450 nanometers. The package has a transmittance of no more than 99 percent at each active wavelength.

18 Claims, 8 Drawing Sheets

(56) References Cited

U.S. PATENT DOCUMENTS

| | | |
|---|---|---|
| 4,120,570 A | 10/1978 | Gaylord |
| 4,136,250 A | 1/1979 | Mueller et al. |
| 4,153,641 A | 5/1979 | Deichert et al. |
| 4,197,266 A | 4/1980 | Clark et al. |
| 4,436,887 A | 3/1984 | Chromecek et al. |
| 4,495,313 A | 1/1985 | Larsen |
| 4,659,782 A | 4/1987 | Spinelli |
| 4,659,783 A | 4/1987 | Spinelli |
| 4,740,533 A | 4/1988 | Su et al. |
| 4,889,664 A | 12/1989 | Kindt-Larsen et al. |
| 4,910,277 A | 3/1990 | Bambury et al. |
| 5,006,622 A | 4/1991 | Kunzler et al. |
| 5,034,461 A | 7/1991 | Lai et al. |
| 5,039,459 A | 8/1991 | Kindt-Larsen et al. |
| 5,070,215 A | 12/1991 | Bambury et al. |
| 5,194,544 A * | 3/1993 | Goldberg ............... A61L 27/16 523/108 |
| 5,236,969 A | 8/1993 | Kunzler et al. |
| 5,244,981 A | 9/1993 | Seidner et al. |
| 5,270,418 A | 12/1993 | Kunzler et al. |
| 5,298,533 A | 3/1994 | Nandu et al. |
| 5,314,960 A | 5/1994 | Spinelli et al. |
| 5,331,067 A | 7/1994 | Seidner et al. |
| 5,371,147 A | 12/1994 | Spinelli et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,824,719 A | 10/1998 | Kunzler et al. |
| 5,849,811 A | 12/1998 | Nicolson et al. |
| 5,962,548 A | 10/1999 | Vanderlaan et al. |
| 5,965,631 A | 10/1999 | Nicolson et al. |
| 5,998,498 A | 12/1999 | Vanderlaan et al. |
| 6,020,445 A | 2/2000 | Vanderlaan et al. |
| 6,087,415 A | 7/2000 | Vanderlaan et al. |
| 6,367,929 B1 | 4/2002 | Maiden et al. |
| 6,420,453 B1 | 7/2002 | Bowers et al. |
| 6,423,761 B1 | 7/2002 | Bowers et al. |
| 6,767,979 B1 | 7/2004 | Muir et al. |
| 6,822,016 B2 | 11/2004 | McCabe et al. |
| 6,867,245 B2 | 3/2005 | Iwata et al. |
| 6,943,203 B2 | 9/2005 | Vanderlaan et al. |
| 6,951,894 B1 | 10/2005 | Nicolson et al. |
| 7,052,131 B2 | 5/2006 | McCabe et al. |
| 7,247,692 B2 | 7/2007 | Laredo |
| 7,249,848 B2 | 7/2007 | Laredo et al. |
| 7,396,890 B2 | 7/2008 | Zanini et al. |
| 7,461,937 B2 | 12/2008 | Steffen et al. |
| 7,468,398 B2 | 12/2008 | Nicolson et al. |
| 7,538,146 B2 | 5/2009 | Nicolson et al. |
| 7,553,880 B2 | 6/2009 | Nicolson et al. |
| 7,572,841 B2 | 8/2009 | Chen et al. |
| 7,666,921 B2 | 2/2010 | McCabe et al. |
| 7,691,916 B2 | 4/2010 | McCabe et al. |
| 7,786,185 B2 | 8/2010 | Rathore et al. |
| 7,825,170 B2 | 11/2010 | Steffen et al. |
| 7,915,323 B2 | 3/2011 | Awasthi et al. |
| 7,934,830 B2 | 5/2011 | Blackwell et al. |
| 7,956,131 B2 | 6/2011 | Arnold et al. |
| 7,994,356 B2 | 8/2011 | Awasthi et al. |
| 8,022,158 B2 | 9/2011 | Rathore et al. |
| 8,026,326 B2 | 9/2011 | Benz et al. |
| 8,138,290 B2 | 3/2012 | Blackwell et al. |
| 8,163,206 B2 | 4/2012 | Chang et al. |
| 8,273,802 B2 | 9/2012 | Laredo et al. |
| 8,389,597 B2 | 3/2013 | Blackwell et al. |
| 8,399,538 B2 | 3/2013 | Steffen et al. |
| 8,415,404 B2 | 4/2013 | Nicolson et al. |
| 8,420,711 B2 | 4/2013 | Awasthi et al. |
| 8,450,387 B2 | 5/2013 | McCabe et al. |
| 8,459,445 B2 | 6/2013 | Newman |
| 8,470,906 B2 | 6/2013 | Rathore et al. |
| 8,487,058 B2 | 7/2013 | Liu et al. |
| 8,507,577 B2 | 8/2013 | Zanini et al. |
| 8,568,626 B2 | 10/2013 | Nicolson et al. |
| 8,637,621 B2 | 1/2014 | Iwata et al. |
| 8,703,891 B2 | 4/2014 | Broad |
| 8,937,110 B2 | 1/2015 | Alli et al. |
| 8,937,111 B2 | 1/2015 | Alli et al. |
| 8,940,812 B2 | 1/2015 | Reboul et al. |
| 8,980,972 B2 | 3/2015 | Driver |
| 9,056,878 B2 | 6/2015 | Fujisawa et al. |
| 9,057,821 B2 | 6/2015 | Broad et al. |
| 9,125,808 B2 | 9/2015 | Alli et al. |
| 9,140,825 B2 | 9/2015 | Alli et al. |
| 9,156,934 B2 | 10/2015 | Alli et al. |
| 9,170,349 B2 | 10/2015 | Mahadevan et al. |
| 9,217,813 B2 | 12/2015 | Liu et al. |
| 9,244,196 B2 | 1/2016 | Scales et al. |
| 9,244,197 B2 | 1/2016 | Alli et al. |
| 9,260,544 B2 | 2/2016 | Rathore et al. |
| 9,297,928 B2 | 3/2016 | Molock et al. |
| 9,297,929 B2 | 3/2016 | Scales et al. |
| 10,618,257 B2 | 4/2020 | Suzuki et al. |
| 2005/0205451 A1 | 9/2005 | Brown-skrobot |
| 2008/0017525 A1* | 1/2008 | Newman ............... A45C 11/008 206/5.1 |
| 2010/0048847 A1 | 2/2010 | Broad |
| 2010/0090181 A1 | 4/2010 | Wehefritz |
| 2015/0174084 A1* | 6/2015 | Kaufmann ............... A61K 47/10 514/648 |
| 2018/0356558 A1 | 12/2018 | Ochrombel |
| 2019/0271798 A1 | 9/2019 | Mahadevan et al. |
| 2020/0114603 A1* | 4/2020 | Chen ....................... G02C 7/04 |
| 2020/0189823 A1 | 6/2020 | Ho et al. |
| 2021/0015227 A1 | 1/2021 | Swamy et al. |
| 2021/0018661 A1 | 1/2021 | Swamy et al. |

OTHER PUBLICATIONS

Crivello, et al, Photoinitiators for Free Radical Cationic & Anionic Photopolymerisation, 2nd Edition, vol. III, pp. 275-298, John Wiley and Sons, New York, 1998.

Ham et al., "Retinal sensitivity to damage from short wavelength light." Nature 260 (1976), pp. 153-155.

Hoover, Solar ultraviolet irradiation of human cornea, lens, and retina: equations of ocular irradiation, Applied Optics, Feb. 1986, vol. 25(3), pp. 359-368).

International Conference on Harmonisation (ICH) of Technical Requirements for Registration of Pharmaceuticals for Human Use guideline, Q1B Photostability Testing of New Drug Substances and Products, published on Nov. 1996.

Kolozsvari et al., UV Absorbance of the Human Cornea in the 240- to 400-nm Range, Investigative Ophthalmology & Visual Science, Jul. 2002, vol. 43(7), pp. 2165-2168.

Statement on Ocular Ultraviolet Radiation Hazards in Sunlight, American Optometric Association, Nov. 10, 1993.

U.S. Appl. No. 16/398,722, filed Apr. 30, 2019.

U.S. Appl. No. 16/548,204, filed Aug. 22, 2019.

PCT International Search Report, dated Mar. 1, 2021, for PCT Int'l Appln. No. PCT/IB2020/061498.

\* cited by examiner

CONTACT LENS CONTAINING PHOTOSENSITIVE CHROMOPHORE AND PACKAGE THEREFOR

RELATED APPLICATIONS

This application claims priority to U.S. Provisional Patent Application Ser. No. 62/950,577, filed Dec. 19, 2019, which is incorporated herein by reference in its entirety.

FIELD OF THE INVENTION

The invention relates to a contact lens system that includes a contact lens containing a photosensitive chromophore and a surrounding package for protecting the chromophore from photodegradation.

BACKGROUND OF THE INVENTION

High energy light from the sun, such as UV light and high-energy visible light, is known to be responsible for cellular damage. While most of the radiation below 280 nm in wavelength is absorbed by the earth's atmosphere, photons possessing wavelengths ranging between 280 and 400 nm have been associated with several ocular disorders including corneal degenerative changes, and age-related cataract and macular degeneration. (See Statement on Ocular Ultraviolet Radiation Hazards in Sunlight, American Optometric Association, Nov. 10, 1993). The human cornea absorbs some radiation up to 320 nm in wavelength (30% transmission) (Kolozsvari et al., *Investigative Ophthalmology & Visual Science*, July 2002, Vol. 43(7), pp. 2165-2168; Hoover, *Applied Optics, February* 1986, Vol. 25(3), pp. 359-368), but is inefficient in protecting the back of the eye from radiation ranging from 320 to 400 nm in wavelength.

Contact lens standards define the upper UV radiation wavelength at 380 nm. The current Class I UV absorbing criteria defined by the American Optometric Association require >99% of the radiation between 280 and 315 nm (UV B) and >90% of the 316 to 380 nm (UV A) radiation to be absorbed by the contact lens. While the criteria effectively address protection of the cornea (<1% UV B transmittance), there is little attention paid to the lower energy UV radiation (>380 <400 nm) associated with retinal damage (Ham, W.T, Mueller, H. A., Sliney, D. H. *Nature* 1976; 260(5547):153-5) or to high energy visible radiation.

High energy visible (HEV) radiation (e.g., 400 to 450 nm) may cause visual discomfort or circadian rhythm disruption. For example, computer and electronic device screens, flat screen televisions, energy efficient lights, and LED lights are known to generate HEV light. Prolonged exposure to such sources of HEV light may cause eye strain. In addition, viewing HEV light emitting devices at night is postulated to disrupt the natural circadian rhythm leading, for example, to inadequate sleep.

Reducing the amount of HEV light absorbed by the eye is a desirable goal in the ophthalmic field. It is sometimes the case, however, that chromophores that absorb HEV light and are otherwise desirable for use as HEV light filters in contact lenses nevertheless suffer from a sensitivity to ambient light, which results in their photodegradation. This photosensitivity can manifest itself in a number of undesirable ways, which may include yellowing or discoloration of the lens, and/or degradation over time of the chromophore's ability to absorb the HEV wavelengths for which it was originally selected. Thus, shelf life, cosmetic appeal, and performance of a contact lens can all be negatively impacted when a chromophore in the lens is photosensitive.

There is a need for materials that provide targeted absorption of undesirable wavelengths of high energy radiation and that are processable into functional products; where such materials are photosensitive, technologies for protecting them from photodegradation are also desirable.

SUMMARY OF THE INVENTION

The invention relates to a contact lens system comprising a contact lens containing a photosensitive chromophore and a package for protecting the photosensitive chromophore from photodegradation.

The package used in the contact lens system of the invention at least partially blocks the wavelengths of light that could otherwise photodegrade the chromophore. The package therefore is capable of stabilizing the photosensitive chromophore against photodegradation.

Advantageously, a package according to the invention, while protecting the chromophore, may transmit light of other wavelengths, thus allowing the contents of the package to be visible, for instance to the naked eye and/or to testing equipment that is used during the lens production process. A further advantage of the invention is that the level of protection afforded by the package can be modulated by changing the amount of light that it blocks. This allows a manufacturer to specifically control the shelf life of its products. Products that do not require long shelf life could be contained in packages that only partially block the light that would otherwise degrade the chromophore. On the other hand, if longer shelf life is desired, a package that provides greater blocking may be used.

Thus, more specifically, the invention provides a contact lens system. The contact lens system comprises: a contact lens containing a photosensitive chromophore, the photosensitive chromophore having at least one active wavelength (defined below) between 250 and 400 nanometers and at least one active wavelength between 400 and 450 nanometers; and a package surrounding the contact lens, the package having a light transmittance of no more than 99 percent at each active wavelength.

DETAILED DESCRIPTION OF THE INVENTION

Figure 1:
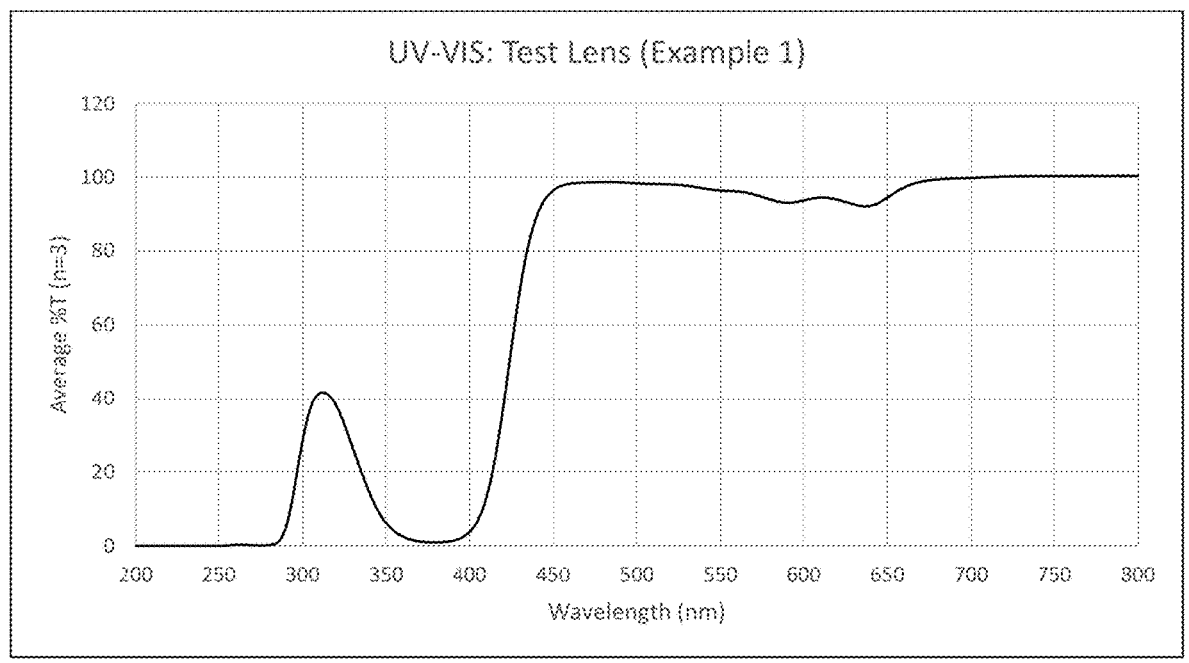
FIG. 1 is a UV/Vis transmission spectrum of a test lens according to Example 1.

It is to be understood that the invention is not limited to the details of construction or process steps set forth in the following description. The invention is capable of other embodiments and of being practiced or being carried out in various ways using the teaching herein.

With respect to the terms used in this disclosure, the following definitions are provided.

Unless defined otherwise, all technical and scientific terms used herein have the same meaning as commonly understood by one of ordinary skill in the art to which the invention belongs. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski. All publications, patent applications, patents, and other references mentioned herein are incorporated by reference.

As used herein, the term "(meth)" designates optional methyl substitution. Thus, a term such as "(meth)acrylates" denotes both methacrylates and acrylates.

Wherever chemical structures are given, it should be appreciated that alternatives disclosed for the substituents on the structure may be combined in any combination. Thus, if a structure contained substituents R* and R**, each of which contained three lists of potential groups, 9 combinations are disclosed. The same applies for combinations of properties.

When a subscript, such as "n" in the generic formula [* * *]$_n$, is used to depict the number of repeating units in a polymer's chemical formula, the formula should be interpreted to represent the number average molecular weight of the macromolecule.

The term "individual" includes humans and vertebrates.

The term "ocular surface" includes the surface and glandular epithelia of the cornea, conjunctiva, lacrimal gland, accessory lacrimal glands, nasolacrimal duct and meibomian gland, and their apical and basal matrices, puncta and adjacent or related structures, including eyelids linked as a functional system by both continuity of epithelia, by innervation, and the endocrine and immune systems.

The term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultraviolet light absorbing, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

The contact lenses of the invention may be comprised of silicone hydrogels or conventional hydrogels. Silicone hydrogels typically contain at least one hydrophilic monomer and at least one silicone-containing component that are covalently bound to one another in the cured device.

"Target macromolecule" means the macromolecule being synthesized from the reactive monomer mixture comprising monomers, macromers, prepolymers, cross-linkers, initiators, additives, diluents, and the like.

The term "polymerizable compound" means a compound containing one or more polymerizable groups. The term encompasses, for instance, monomers, macromers, oligomers, prepolymers, cross-linkers, and the like.

"Polymerizable groups" are groups that can undergo chain growth polymerization, such as free radical and/or cationic polymerization, for example a carbon-carbon double bond which can polymerize when subjected to radical polymerization initiation conditions. Non-limiting examples of free radical polymerizable groups include (meth)acrylates, styrenes, vinyl ethers, (meth)acrylamides, N-vinyllactams, N-vinylamides, O-vinylcarbamates, O-vinylcarbonates, and other vinyl groups. Preferably, the free radical polymerizable groups comprise (meth)acrylate, (meth)acrylamide, N-vinyl lactam, N-vinylamide, and styryl functional groups, and mixtures of any of the foregoing. More preferably, the free radical polymerizable groups comprise (meth)acrylates, (meth)acrylamides, and mixtures thereof. The polymerizable group may be unsubstituted or substituted. For instance, the nitrogen atom in (meth)acrylamide may be bonded to a hydrogen, or the hydrogen may be replaced with alkyl or cycloalkyl (which themselves may be further substituted).

Any type of free radical polymerization may be used including but not limited to bulk, solution, suspension, and emulsion as well as any of the controlled radical polymerization methods such as stable free radical polymerization, nitroxide-mediated living polymerization, atom transfer radical polymerization, reversible addition fragmentation chain transfer polymerization, organotellurium mediated living radical polymerization, and the like.

A "monomer" is a mono-functional molecule which can undergo chain growth polymerization, and in particular, free radical polymerization, thereby creating a repeating unit in the chemical structure of the target macromolecule. Some monomers have di-functional impurities that can act as cross-linking agents. A "hydrophilic monomer" is also a monomer which yields a clear single phase solution when mixed with deionized water at 25° C. at a concentration of 5 weight percent. A "hydrophilic component" is a monomer, macromer, prepolymer, initiator, cross-linker, additive, or polymer which yields a clear single phase solution when mixed with deionized water at 25° C. at a concentration of 5 weight percent. A "hydrophobic component" is a monomer, macromer, prepolymer, initiator, cross-linker, additive, or polymer which is slightly soluble or insoluble in deionized water at 25° C.

A "macromolecule" is an organic compound having a number average molecular weight of greater than 1500, and may be reactive or non-reactive.

A "silicone-containing component" is a monomer, macromer, prepolymer, cross-linker, initiator, additive, or polymer in the reactive mixture with at least one silicon-oxygen bond, typically in the form of siloxy groups, siloxane groups, carbosiloxane groups, and mixtures thereof.

Examples of silicone-containing components which are useful in this invention may be found in U.S. Pat. Nos. 3,808,178, 4,120,570, 4,136,250, 4,153,641, 4,740,533, 5,034,461, 5,070,215, 5,244,981, 5,314,960, 5,331,067, 5,371,147, 5,760,100, 5,849,811, 5,962,548, 5,965,631, 5,998,498, 6,367,929, 6,822,016, 6,943,203, 6,951,894, 7,052,131, 7,247,692, 7,396,890, 7,461,937, 7,468,398, 7,538,146, 7,553,880, 7,572,841, 7,666,921, 7,691,916, 7,786,185, 7,825,170, 7,915,323, 7,994,356, 8,022,158, 8,163,206, 8,273,802, 8,399,538, 8,415,404, 8,420,711, 8,450,387, 8,487,058, 8,568,626, 8,937,110, 8,937,111, 8,940,812, 8,980,972, 9,056,878, 9,125,808, 9,140,825, 9,156,934, 9,170,349, 9,217,813, 9,244,196, 9,244,197, 9,260,544, 9,297,928, 9,297,929, and European Patent No. 080539. These patents are hereby incorporated by reference in their entireties.

A "polymer" is a target macromolecule composed of the repeating units of the monomers used during polymerization.

A "repeating unit" is the smallest group of atoms in a polymer that corresponds to the polymerization of a specific monomer or macromer.

An "initiator" is a molecule that can decompose into radicals which can subsequently react with a monomer to initiate a free radical polymerization reaction. A thermal initiator decomposes at a certain rate depending on the temperature; typical examples are azo compounds such as 1,1'-azobisisobutyronitrile and 4,4'-azobis(4-cyanovaleric acid), peroxides such as benzoyl peroxide, tert-butyl peroxide, tert-butyl hydroperoxide, tert-butyl peroxybenzoate, dicumyl peroxide, and lauroyl peroxide, peracids such as peracetic acid and potassium persulfate as well as various redox systems. A photo-initiator decomposes by a photochemical process; typical examples are derivatives of benzil, benzoin, acetophenone, benzophenone, camphorquinone, and mixtures thereof as well as various monoacyl and bisacyl phosphine oxides and combinations thereof.

A "cross-linking agent" is a di-functional or multi-functional monomer or macromer which can undergo free radical polymerization at two or more locations on the molecule, thereby creating branch points and a polymeric network. Common examples are ethylene glycol dimethacrylate, tetraethylene glycol dimethacrylate, trimethylolpropane trimethacrylate, methylene bisacrylamide, triallyl cyanurate, and the like.

A "prepolymer" is a reaction product of monomers which contains remaining polymerizable groups capable of undergoing further reaction to form a polymer.

A "polymeric network" is a cross-linked macromolecule that may swell but cannot dissolve in solvents. "Hydrogels" are polymeric networks that swell in water or aqueous solutions, typically absorbing at least 10 weight percent water. "Silicone hydrogels" are hydrogels that are made from at least one silicone-containing component with at least one hydrophilic component. Hydrophilic components may also include non-reactive polymers.

"Conventional hydrogels" refer to polymeric networks made from components without any siloxy, siloxane or carbosiloxane groups. Conventional hydrogels are prepared from reactive mixtures comprising hydrophilic monomers. Examples include 2-hydroxyethyl methacrylate ("HEMA"), N-vinyl pyrrolidone ("NVP"), N,N-dimethylacrylamide ("DMA") or vinyl acetate. U.S. Pat. Nos. 4,436,887, 4,495,313, 4,889,664, 5,006,622, 5,039459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Conventional hydrogels may also be formed from polyvinyl alcohol. Conventional hydrogel lenses may contain a coating, and the coating may be the same or different material from the substrate. Conventional hydrogels may include additives such as polyvinyl pyrrolidone, and comonomers including phosphoryl choline, methacrylic acid and the like. Commercially available conventional hydrogels include, but are not limited to, etafilcon, genfilcon, hilafilcon, lenefilcon, nesofilcon, omafilcon, polymacon, and vifilcon, including all of their variants.

"Silicone hydrogels" refer to polymeric networks made from at least one hydrophilic component and at least one silicone-containing component. Examples of suitable families of hydrophilic components that may be present in the reactive mixture include (meth)acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof. Silicone-containing components are well known and have been extensively described in the patent literature. For instance, the silicone-containing component may comprise at least one polymerizable group (e.g., a (meth)acrylate, a styryl, a vinyl ether, a (meth)acrylamide, an N-vinyl lactam, an N-vinylamide, an O-vinylcarbamate, an O-vinylcarbonate, a vinyl group, or mixtures of the foregoing), at least one siloxane group, and one or more linking groups (which may be a bond) connecting the polymerizable group(s) to the siloxane group(s). The silicone-containing components may, for instance, contain from 1 to 220 siloxane repeat units. The silicone-containing component may also contain at least one fluorine atom. Silicone hydrogel lenses may contain a coating, and the coating may be the same or different material from the substrate.

Examples of silicone hydrogels include acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9156,934, 9,170,349, 9,244,196, 9,244,197, 9,260,544, 9,297,928, 9,297,929 as well as WO 03/22321, WO 2008/061992, and US 2010/0048847. These patents are hereby incorporated by reference in their entireties.

An "interpenetrating polymeric network" comprises two or more networks which are at least partially interlaced on the molecular scale but not covalently bonded to each other and which cannot be separated without braking chemical bonds. A "semi-interpenetrating polymeric network" comprises one or more networks and one or more polymers characterized by some mixing on the molecular level between at least one network and at least one polymer. A mixture of different polymers is a "polymer blend." A semi-interpenetrating network is technically a polymer blend, but in some cases, the polymers are so entangled that they cannot be readily removed.

"Reactive components" are the polymerizable compounds (such as monomers, macromers, oligomers, prepolymers, and cross-linkers) in the reactive mixture (defined below), as well as any other components in the reactive mixture which are intended to substantially remain in the resultant polymeric network after polymerization and all work-up steps (such as extraction steps) and packaging steps have been completed. Reactive components may be retained in the polymeric network by covalent bonding, hydrogen bonding, electrostatic interactions, the formation of interpenetrating polymeric networks, or any other means. Components that are intended to release from the polymeric network once it is in use are still considered "reactive components." For example, pharmaceutical or nutraceutical components in a contact lens which are intended to be released during wear are considered "reactive components." Components that are intended to be removed from the polymeric network during the manufacturing process (e.g., by extraction), such as diluents, are not "reactive components."

The terms "reactive mixture" and "reactive monomer mixture" refer to the mixture of components which are mixed together and, when subjected to polymerization conditions, result in formation of a polymeric network (such as conventional or silicone hydrogels) as well as contact lenses made therefrom. The reactive mixture may comprise reactive components such as monomers, macromers, prepolymers, cross-linkers, and initiators, additives such as wetting agents, polymers, dyes, light absorbing compounds such as UV absorbers and/or HEV absorbers, pigments, photochromic compounds, pharmaceutical compounds, and/or nutraceutical compounds, any of which may be polymerizable or non-polymerizable but are capable of being retained within the resulting contact lens. The reactive mixture may also contain other components which are intended to be removed from the device prior to its use, such as diluents. It will be appreciated that a wide range of additives may be added based upon the contact lens which is made and its intended use. Concentrations of components of the reactive mixture are expressed as weight percentages of all reactive components in the reactive mixture, therefore excluding diluents. When diluents are used, their concentrations are expressed as weight percentages based upon the amount of all components in the reactive mixture (including the diluent).

The term "silicone hydrogel contact lens" refers to a hydrogel contact lens that is made from at least one silicone-containing compound. Silicone hydrogel contact lenses generally have increased oxygen permeability compared to conventional hydrogels. Silicone hydrogel contact lenses use both their water and polymer content to transmit oxygen to the eye.

The term "multi-functional" refers to a component having two or more polymerizable groups. The term "mono-functional" refers to a component having one polymerizable group.

The terms "halogen" or "halo" indicate fluorine, chlorine, bromine, and iodine.

"Alkyl" refers to an optionally substituted linear or branched alkyl group containing the indicated number of carbon atoms. If no number is indicated, then alkyl (including any optional substituents on alkyl) may contain 1 to 16 carbon atoms. Preferably, the alkyl group contains 1 to 10 carbon atoms, alternatively 1 to 8 carbon atoms, alternatively 1 to 6 carbon atoms, or alternatively 1 to 4 carbon atoms. Examples of alkyl include methyl, ethyl, propyl, isopropyl, butyl, iso-, sec- and tert-butyl, pentyl, hexyl, heptyl, 3-ethylbutyl, and the like. Examples of substituents on alkyl include 1, 2, or 3 groups independently selected from hydroxy, amino, amido, oxa, carboxy, alkyl carboxy, carbonyl, alkoxy, thioalkyl, carbamate, carbonate, halogen, phenyl, benzyl, and combinations thereof. "Alkylene" means a divalent alkyl group, such as —CH$_2$—, —CH$_2$CH$_2$—, —CH$_2$CH$_2$CH$_2$—, —CH$_2$CH(CH$_3$)CH$_2$—, and —CH$_2$CH$_2$CH$_2$CH$_2$—.

"Haloalkyl" refers to an alkyl group as defined above substituted with one or more halogen atoms, where each halogen is independently F, Cl, Br or I. A preferred halogen is F. Preferred haloalkyl groups contain 1-6 carbons, more preferably 1-4 carbons, and still more preferably 1-2 carbons. "Haloalkyl" includes perhaloalkyl groups, such as —CF$_3$— or —CF$_2$CF$_3$—. "Haloalkylene" means a divalent haloalkyl group, such as —CH$_2$CF$_2$—.

"Cycloalkyl" refers to an optionally substituted cyclic hydrocarbon containing the indicated number of ring carbon atoms. If no number is indicated, then cycloalkyl may contain 3 to 12 ring carbon atoms. Preferred are C$_3$-C$_8$ cycloalkyl groups, C$_3$-C$_7$ cycloalkyl, more preferably C$_4$-C$_7$ cycloalkyl, and still more preferably C$_5$-C$_6$ cycloalkyl. Examples of cycloalkyl include cyclopropyl, cyclobutyl, cyclopentyl, cyclohexyl, cycloheptyl and cyclooctyl. Examples of substituents on cycloalkyl include 1, 2, or 3 groups independently selected from alkyl, hydroxy, amino, amido, oxa, carbonyl, alkoxy, thioalkyl, amido, carbamate, carbonate, halo, phenyl, benzyl, and combinations thereof. "Cycloalkylene" means a divalent cycloalkyl group, such as 1,2-cyclohexylene, 1,3-cyclohexylene, or 1,4-cyclohexylene.

"Heterocycloalkyl" refers to a cycloalkyl ring or ring system as defined above in which at least one ring carbon has been replaced with a heteroatom selected from nitrogen, oxygen, and sulfur. The heterocycloalkyl ring is optionally fused to or otherwise attached to other heterocycloalkyl rings and/or non-aromatic hydrocarbon rings and/or phenyl rings. Preferred heterocycloalkyl groups have from 5 to 7 members. More preferred heterocycloalkyl groups have 5 or 6 members. Heterocycloalkylene means a divalent heterocycloalkyl group.

"Aryl" refers to an optionally substituted aromatic hydrocarbon ring system containing at least one aromatic ring. The aryl group contains the indicated number of ring carbon atoms. If no number is indicated, then aryl may contain 6 to 14 ring carbon atoms. The aromatic ring may optionally be fused or otherwise attached to other aromatic hydrocarbon rings or non-aromatic hydrocarbon rings. Examples of aryl groups include phenyl, naphthyl, and biphenyl. Preferred examples of aryl groups include phenyl. Examples of substituents on aryl include 1, 2, or 3 groups independently selected from alkyl, hydroxy, amino, amido, oxa, carboxy, alkyl carboxy, carbonyl, alkoxy, thioalkyl, carbamate, carbonate, halo, phenyl, benzyl, and combinations thereof. "Arylene" means a divalent aryl group, for example 1,2-phenylene, 1,3-phenylene, or 1,4-phenylene.

"Heteroaryl" refers to an aryl ring or ring system, as defined above, in which at least one ring carbon atom has been replaced with a heteroatom selected from nitrogen, oxygen, and sulfur. The heteroaryl ring may be fused or otherwise attached to one or more heteroaryl rings, aromatic or nonaromatic hydrocarbon rings or heterocycloalkyl rings. Examples of heteroaryl groups include pyridyl, furyl, and thienyl. "Heteroarylene" means a divalent heteroaryl group.

"Alkoxy" refers to an alkyl group attached to the parent molecular moiety through an oxygen bridge. Examples of alkoxy groups include, for instance, methoxy, ethoxy, propoxy and isopropoxy. "Thioalkyl" means an alkyl group attached to the parent molecule through a sulfur bridge. Examples of thioalkyl groups include, for instance, methylthio, ethylthio, n-propylthio and iso-propylthio. "Aryloxy" refers to an aryl group attached to a parent molecular moiety through an oxygen bridge. Examples include phenoxy. "Cyclic alkoxy" means a cycloalkyl group attached to the parent moiety through an oxygen bridge.

"Alkylamine" refers to an alkyl group attached to the parent molecular moiety through an —NH bridge. Alkyleneamine means a divalent alkylamine group, such as —CH$_2$CH$_2$NH—.

"Siloxanyl" refers to a structure having at least one Si—O—Si bond. Thus, for example, siloxanyl group means a group having at least one Si—O—Si group (i.e. a siloxane group), and siloxanyl compound means a compound having at least one Si—O—Si group. "Siloxanyl" encompasses monomeric (e.g., Si—O—Si) as well as oligomeric/polymeric structures (e.g., —[Si—O]$_n$—, where n is 2 or more). Each silicon atom in the siloxanyl group is substituted with independently selected R$^A$ groups (where R$^A$ is as defined in formula A options (b)-(i)) to complete their valence.

"Silyl" refers to a structure of formula R$_3$Si— and "siloxy" refers to a structure of formula R$_3$Si—O—, where each R in silyl or siloxy is independently selected from trimethylsiloxy, $C_1$-$C_8$ alkyl (preferably $C_1$-$C_3$ alkyl, more preferably ethyl or methyl), and $C_3$-$C_8$ cycloalkyl.

"Alkyleneoxy" refers to groups of the general formula -(alkylene-O)$_p$— or —(O-alkylene)$_p$-, wherein alkylene is as defined above, and p is from 1 to 200, or from 1 to 100, or from 1 to 50, or from 1 to 25, or from 1 to 20, or from 1 to 10, wherein each alkylene is independently optionally substituted with one or more groups independently selected from hydroxyl, halo (e.g., fluoro), amino, amido, ether, carbonyl, carboxyl, and combinations thereof. If p is greater than 1, then each alkylene may be the same or different and the alkyleneoxy may be in block or random configuration. When alkyleneoxy forms a terminal group in a molecule, the terminal end of the alkyleneoxy may, for instance, be a hydroxy or alkoxy (e.g., HO—[$CH_2CH_2O$]$_p$— or $CH_3O$—[$CH_2CH_2O$]$_p$—). Examples of alkyleneoxy include polyethyleneoxy, polypropyleneoxy, polybutyleneoxy, and poly(ethyleneoxy-co-propyleneoxy).

"Oxaalkylene" refers to an alkylene group as defined above where one or more non-adjacent $CH_2$ groups have been substituted with an oxygen atom, such as —$CH_2CH_2OCH(CH_3)CH_2$—. "Thiaalkylene" refers to an alkylene group as defined above where one or more non-adjacent $CH_2$ groups have been substituted with a sulfur atom, such as —$CH_2CH_2SCH(CH_3)CH_2$—.

The term "linking group" refers to a moiety that links a polymerizable group to the parent molecule. The linking group may be any moiety that is compatible with the compound of which it is a part, and that does not undesirably interfere with the polymerization of the compound, is stable under the polymerization conditions as well as the conditions for the processing and storage of the final product. For instance, the linking group may be a bond, or it may comprise one or more alkylene, haloalkylene, amide, amine, alkyleneamine, carbamate, ester (—$CO_2$—), arylene, heteroarylene, cycloalkylene, heterocycloalkylene, alkyleneoxy, oxaalkylene, thiaalkylene, haloalkyleneoxy (alkyleneoxy substituted with one or more halo groups, e.g., —$OCF_2$—, —$OCF_2CF_2$—, —$OCF_2CH_2$—), siloxanyl, alkylenesiloxanyl, or combinations thereof. The linking group may optionally be substituted with 1 or more substituent groups. Suitable substituent groups may include those independently selected from alkyl, halo (e.g., fluoro), hydroxyl, HO-alkyleneoxy, MeO-alkyleneoxy, siloxanyl, siloxy, siloxy-alkyleneoxy-, siloxy-alkylene-alkyleneoxy- (where more than one alkyleneoxy groups may be present and wherein each methylene in alkylene and alkyleneoxy is independently optionally substituted with hydroxyl), ether, amine, carbonyl, carbamate, and combinations thereof. The linking group may also be substituted with a polymerizable group, such as (meth)acrylate (in addition to the polymerizable group to which the linking group is linked).

Preferred linking groups include $C_1$-$C_8$ alkylene (preferably $C_2$-$C_6$ alkylene) and $C_1$-$C_8$ oxaalkylene (preferably $C_2$-$C_6$ oxaalkylene), each of which is optionally substituted with 1 or 2 groups independently selected from hydroxyl and siloxy. Preferred linking groups also include carboxylate, amide, $C_1$-$C_8$ alkylene-carboxylate-$C_1$-$C_8$ alkylene, or $C_1$-$C_8$ alkylene-amide-$C_1$-$C_8$ alkylene.

When the linking group is comprised of combinations of moieties as described above (e.g., alkylene and cycloalkylene), the moieties may be present in any order. For instance, if in Formula A below, L is indicated as being -alkylene-cycloalkylene-, then Rg-L may be either Rg-alkylene-cycloalkylene-, or Rg-cycloalkylene-alkylene-. Notwithstanding this, the listing order represents the preferred order in which the moieties appear in the compound starting from the terminal polymerizable group (Rg or Pg) to which the linking group is attached. For example, if in Formula A, L is indicated as being alkylene-cycloalkylene, then Rg-L is preferably Rg-alkylene-cycloalkylene-.

The terms "light absorbing compound" refers to a chemical material that absorbs light within the visible spectrum (e.g., in the 380 to 780 nm range). A "high energy radiation absorber," "UV/HEV absorber," or "high energy light absorbing compound" is a chemical material that absorbs various wavelengths of ultraviolet light, high energy visible light, or both. A material's ability to absorb certain wavelengths of light can be determined by measuring its UV/Vis transmission or absorbance spectrum.

The terms "high energy visible light absorbing," "HEV light absorbing" or similar terms refer to contact lenses that limit transmission of one or more wavelengths of high energy visible light through the lens, for instance in the range of 400 to 450 nm. A material's ability to absorb certain wavelengths of light can be determined by measuring its UV/Vis transmission spectrum. Materials that exhibit no absorption at a particular wavelength will exhibit substantially 100 percent transmission at that wavelength. Conversely, materials that completely absorb at a particular wavelength will exhibit substantially 0% transmission at that wavelength. As used herein, if the amount of a contact lens's transmission is indicated as a percentage across a particular wavelength range, it is to be understood that the contact lens exhibits the percent transmission at all wavelengths across that range. On the other hand, reference to an "average transmission" may be calculated as the average of the percent transmission in 1 nm increments over the identified range.

The term "photosensitive" means that a contact lens containing a chromophore (preferably an HEV light absorbing chromophore) exhibits photodegradation as demonstrated by a change in average transmission of at least 2 percent over a wavelength range of 400 to 450 nm. Various methods of exposure may be used. A preferred method of light exposure is that described by the International Conference on Harmonisation (ICH) of Technical Requirements for Registration of Pharmaceuticals for Human Use guideline, Q1B Photostability Testing of New Drug Substances and Products, published on November 1996. Preferably, the exposure is conducted under the ICH Photostability Guideline using an Option 2 light source with an estimated illuminance exposure of $1.5192 \times 10^6$ Lux hours (168.8 hours exposure time) and an estimated ultraviolet irradiation exposure of 259.4 Watt hours/$m^2$ (16.2 hours exposure time), preferably in a photostability chamber that is controlled at 25° C./Amb RH. After exposure, the UV/Vis spectrum of the sample is collected and compared to the spectrum of a sample that has been protected from exposure. By way of example, contact lenses containing photosensitive chromophores according to the invention, after exposure to light under ICH guideline Q1B conditions (sometimes shortened herein to "ICH guideline Q1B" or "Q1B conditions") as described above, exhibit at least a 2 percent, or at least a 5 percent, or at least a 7 percent, or at least a 10 percent, change in their average transmission over a wavelength range of 400 to 450 nm. Such changes may be calculated as the absolute value of the difference between the average transmission (over the indicated wavelength range) with and without the light exposure. A photosensitive chromophore according to the invention is preferably not photochromic (photochromic materials generally reversibly darken upon exposure to specific intensities and wavelengths of light).

The terms "photostabilize," "photostabilized," or similar expressions mean that a contact lens containing a photosensitive chromophore, as described herein, is protected against photodegradation such that it exhibits less change in average transmission over the wavelength range of 400 to 450 nm, following exposure under ICH guideline Q1B conditions as described above, than would be exhibited in the absence of the protection.

The term "active wavelength" means a wavelength in the material's UV/Vis spectrum where the percent transmittance is 85 percent or less at that wavelength.

The term "primary package" refers to a package directly containing a contact lens for use by a lens wearer. A primary package may, for instance, be a vial or it may be a blister package that includes a shell or base portion sealed with a laminated foil or cover. Typically, a primary package may contain one contact lens in a small amount of a packaging solution.

A "secondary package" is typically the outer package in which the primary package is housed. It may, for instance, be a carton. A secondary package differs from a primary package in that the secondary package does not directly contact the contact lens packaging solution. A secondary package may typically contain multiple primary packages, although secondary packages that contain one primary package are also contemplated.

Unless otherwise indicated, ratios, percentages, parts, and the like are by weight.

Unless otherwise indicated, numeric ranges, for instance as in "from 2 to 10" or "between 2 and 10" are inclusive of the numbers defining the range (e.g., 2 and 10).

As noted above, the invention provides a contact lens system comprising: a contact lens containing a photosensitive chromophore, the photosensitive chromophore having at least one active wavelength between 250 and 400 nanometers and at least one active wavelength between 400 and 450 nanometers; and a package surrounding the contact lens, the package having a transmittance of no more than 99 percent at each active wavelength.

Any type of contact lens may be used in the contact lens system of the invention, including soft contact lenses, hard contact lenses, rigid gas permeable (RGP) contact lenses, and hybrid contact lenses. Preferably, the contact lens is a soft hydrogel contact lens (either conventional hydrogel or silicone hydrogel).

The contact lens contains a photosensitive chromophore that has at least one active wavelength (as defined above) between 250 and 400 nanometers and at least one active wavelength between 400 and 450 nm. Preferably, the at least one active wavelength between 400 and 450 nm includes at least one an active wavelength between 400 and 425 nm, or between 400 and 420 nm, or between 400 and 415 nm, or between 400 and 410 nm. More preferably, at least one active wavelength between 400 and 450 nm is between 400 and 410 nm. Further preferably, the transmittance at all wavelengths across the 400 to 410 nm range is 50 percent or less, or 30 percent or less, or 20 percent or less, or 18 percent or less, or 15 percent or less.

Contact lenses containing photosensitive chromophores may generally be prepared by the free radical polymerization of a reactive mixture containing one or more monomers suitable for making the contact lens (also referred to herein as device forming monomers or hydrogel forming monomers), and optional components. The reactive mixture may include the photosensitive chromophore as either a polymerizable monomer, thus resulting in its covalent incorporation in the lens, or it may be present as a non-polymerizable additive. Other methods of incorporating the photosensitive chromophore in the lens may be used including, for example, by applying the chromophore as part of a coating on the lens (in this case, the chromophore may be polymerizable or non-polymerizable).

Preferably, the photosensitive chromophore is introduced as a polymerizable monomer in the reactive mixture. Such polymerizable chromophores typically include a polymerizable substituent that allows the monomer to be covalently integrated in the contact lens. Any photosensitive chromophore that meets the photosensitivity and active wavelength requirements of the invention may be used. Exemplary compounds include alkoxy aniline derivatives containing a polymerizable group, such as those described in co-pending U.S. patent application Ser. No. 16/398,722, filed Apr. 30, 2019, which is incorporated herein by reference. A specific example of such compounds is: 2-(4-acetyl-3-amino-2,6-dimethoxyphenoxy)ethyl methacrylate. Further exemplary photosensitive chromophores include, for instance, tetrahydronapthalenyl derivatives, such as those described in U.S. patent application Ser. No. 16/548,204, filed Aug. 22, 2019, which is incorporated herein by reference. A specific example of such compounds is 2-((1-amino-8-oxo-5,6,7,8-tetrahydronaphthalen-2-yl)oxy)ethyl methacrylate.

As noted above, the reactive mixture for forming the contact lens contains one or more device forming monomers (and optionally the photosensitive chromophore if being incorporated at this stage). Examples of suitable device forming monomers for soft contact lenses include one or more of: hydrophilic components, hydrophobic components, and/or silicone-containing components. The reactive mixture may contain other materials including, but not limited to, wetting agents such as polyamides, crosslinking agents, UV absorbing compounds, and further components such as diluents and initiators.

Examples of suitable families of hydrophilic monomers that may be present in the reactive mixture include (meth)acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof.

Non-limiting examples of hydrophilic (meth)acrylate and (meth)acrylamide monomers include: acrylamide, N-isopropyl acrylamide, N,N-dimethylaminopropyl(meth)acrylamide, N,N-dimethyl acrylamide (DMA), 2-hydroxyethyl methacrylate (HEMA), 2-hydroxypropyl(meth)acrylate, 3-hydroxypropyl(meth)acrylate, 2,3-dihydroxypropyl (meth)acrylate, 2-hydroxybutyl(meth)acrylate, 3-hydroxybutyl(meth)acrylate, 4-hydroxybutyl(meth)acrylate, N-(2-hydroxyethyl)(meth)acrylamide, N,N-bis(2-hydroxyethyl)(meth)acrylamide, N-(2-hydroxypropyl)(meth)acrylamide, N,N-bis(2-hydroxypropyl)(meth)acrylamide, N-(3-hydroxypropyl)(meth)acrylamide, N-(2-hydroxybutyl)(meth) acrylamide, N-(3-hydroxybutyl)(meth)acrylamide, N-(4-hydroxybutyl)(meth)acrylamide, 2-aminoethyl(meth)acrylate, 3-aminopropyl(meth)acrylate, 2-aminopropyl(meth)acrylate, N-2-aminoethyl(meth)acrylamides), N-3-aminopropyl (meth)acrylamide, N-2-aminopropyl(meth)acrylamide, N,N-bis-2-aminoethyl(meth)acrylamides, N,N-bis-3-aminopropyl(meth)acrylamide), N,N-bis-2-aminopropyl(meth) acrylamide, glycerol methacrylate, polyethyleneglycol monomethacrylate, (meth)acrylic acid, vinyl acetate, acrylonitrile, and mixtures thereof.

Hydrophilic monomers may also be ionic, including anionic, cationic, zwitterions, betaines, and mixtures thereof. Non-limiting examples of such charged monomers include (meth)acrylic acid, N-[(ethenyloxy)carbonyl]-β-alanine (VINAL), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT), 1-propanaminium, N,N-dimethyl-N4-[3-[(1-oxo-2-propen-1-yl)amino]propyl]-3-sulfo-, inner salt (SBT), 3,5-Dioxa-8-aza-4-phosphaundec-10-en-1-aminium, 4-hydroxy-N,N,N-trimethyl-9-oxo-, inner salt, 4-oxide (9CI) (PBT), 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), and methacryloyloxy)propyl)dimethylammonio)propane-1-sulfonate (MAPDAPS).

Non-limiting examples of hydrophilic N-vinyl lactam and N-vinyl amide monomers include: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-ethyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-vinylimidazole, and mixtures thereof.

Non-limiting examples of hydrophilic O-vinyl carbamates and O-vinyl carbonates monomers include N-2-hydroxyethyl vinyl carbamate and N-carboxy-β-alanine N-vinyl ester. Further examples of hydrophilic vinyl carbonate or vinyl carbamate monomers are disclosed in U.S. Pat. No. 5,070,215. Hydrophilic oxazolone monomers are disclosed in U.S. Pat. No. 4,910,277.

Other hydrophilic vinyl compounds include ethylene glycol vinyl ether (EGVE), di(ethylene glycol) vinyl ether (DEGVE), allyl alcohol, and 2-ethyl oxazoline.

The hydrophilic monomers may also be macromers or prepolymers of linear or branched poly(ethylene glycol), poly(propylene glycol), or statistically random or block copolymers of ethylene oxide and propylene oxide, having polymerizable moieties such as (meth)acrylates, styrenes, vinyl ethers, (meth)acrylamides, N-vinylamides, and the like. The macromers of these polyethers have one polymerizable group; the prepolymers may have two or more polymerizable groups.

The preferred hydrophilic monomers of the present invention are DMA, NVP, HEMA, VMA, NVA, and mixtures thereof. Preferred hydrophilic monomers include mixtures of DMA and HEMA. Other suitable hydrophilic monomers will be apparent to one skilled in the art.

Generally, there are no particular restrictions with respect to the amount of the hydrophilic monomer present in the reactive monomer mixture. The amount of the hydrophilic monomers may be selected based upon the desired characteristics of the resulting hydrogel, including water content, clarity, wettability, protein uptake, and the like. Wettability may be measured by contact angle, and desirable contact angles are less than about 100°, less than about 80°, and less than about 60°. The hydrophilic monomer may be present in an amount in the range of, for instance, about 0.1 to about 100 weight percent, alternatively in the range of about 1 to about 80 weight percent, alternatively about 5 to about 65 weight percent, alternatively in the range of about 40 to about 60 weight percent, or alternatively about 55 to about 60 weight percent, based on the total weight of the reactive components in the reactive monomer mixture.

Silicone-containing components that may be present in the reactive mixture typically comprise one or more polymerizable compounds, where each compound independently comprises at least one polymerizable group, at least one siloxane group, and one or more linking groups connecting the polymerizable group(s) to the siloxane group(s). The silicone-containing components may, for instance, contain from 1 to 220 siloxane repeat units, such as the groups defined below. The silicone-containing component may also contain at least one fluorine atom.

The silicone-containing component may comprise: one or more polymerizable groups as defined above; one or more optionally repeating siloxane units; and one or more linking groups connecting the polymerizable groups to the siloxane units. The silicone-containing component may comprise: one or more polymerizable groups that are independently a (meth)acrylate, a styryl, a vinyl ether, a (meth)acrylamide, an N-vinyl lactam, an N-vinylamide, an O-vinylcarbamate, an O-vinylcarbonate, a vinyl group, or mixtures of the foregoing; one or more optionally repeating siloxane units; and one or more linking groups connecting the polymerizable groups to the siloxane units.

The silicone-containing component may comprise: one or more polymerizable groups that are independently a (meth)acrylate, a (meth)acrylamide, an N-vinyl lactam, an N-vinylamide, a styryl, or mixtures of the foregoing; one or more optionally repeating siloxane units; and one or more linking groups connecting the polymerizable groups to the siloxane units.

The silicone-containing component may comprise: one or more polymerizable groups that are independently a (meth)acrylate, a (meth)acrylamide, or mixtures of the foregoing; one or more optionally repeating siloxane units; and one or more linking groups connecting the polymerizable groups to the siloxane units.

The silicone-containing component may comprise one or more polymerizable compounds of Formula A:

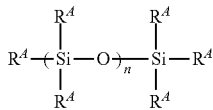

Formula A wherein:
at least one $R^A$ is a group of formula $R_g$-L- wherein $R_g$ is a polymerizable group and L is a linking group, and the remaining $R^A$ are each independently:
(a) $R_g$-L-,
(b) $C_1$-$C_{16}$ alkyl optionally substituted with one or more hydroxy, amino, amido, oxa, carboxy, alkyl carboxy, carbonyl, alkoxy, amido, carbamate, carbonate, halo, phenyl, benzyl, or combinations thereof,
(c) $C_3$-$C_{12}$ cycloalkyl optionally substituted with one or more alkyl, hydroxy, amino, amido, oxa, carbonyl, alkoxy, amido, carbamate, carbonate, halo, phenyl, benzyl, or combinations thereof,
(d) a $C_6$-$C_{14}$ aryl group optionally substituted with one or more alkyl, hydroxy, amino, amido, oxa, carboxy, alkyl carboxy, carbonyl, alkoxy, amido, carbamate, carbonate, halo, phenyl, benzyl, or combinations thereof,
(e) halo,
(f) alkoxy, cyclic alkoxy, or aryloxy,
(g) siloxy,
(h) alkyleneoxy-alkyl or alkoxy-alkyleneoxy-alkyl, such as polyethyleneoxyalkyl, polypropyleneoxyalkyl, or poly(ethyleneoxy-co-propyleneoxyalkyl), or
(i) a monovalent siloxane chain comprising from 1 to 100 siloxane repeat units optionally substituted with alkyl, alkoxy, hydroxy, amino, oxa, carboxy, alkyl carboxy, alkoxy, amido, carbamate, halo or combinations thereof; and n is from 0 to 500 or from 0 to 200, or from 0 to 100, or from 0 to 20, where it is understood that when n is other than 0, n is a distribution having a mode equal to a stated value. When n is 2 or more, the SiO units may carry the same or different $R^A$ substituents and if different $R^A$ substituents are present, the n groups may be in random or block configuration.

In Formula A, three $R^A$ may each comprise a polymerizable group, alternatively two $R^A$ may each comprise a polymerizable group, or alternatively one $R^A$ may comprise a polymerizable group.

Examples of silicone-containing components suitable for use in the invention include, but are not limited to, compounds listed in Table A. Where the compounds in Table A contain polysiloxane groups, the number of SiO repeat units in such compounds, unless otherwise indicated, is preferably from 3 to 100, more preferably from 3 to 40, or still more preferably from 3 to 20.

TABLE A

| | |
|---|---|
| 1 | mono-methacryloxypropyl terminated mono-n-butyl terminated polydimethylsiloxanes (mPDMS) (preferably containing from 3 to 15 SiO repeating units) |
| 2 | mono-acryloxypropyl terminated mono-n-butyl terminated polydimethylsiloxane |
| 3 | mono(meth)acryloxypropyl terminated mono-n-methyl terminated polydimethylsiloxane |
| 4 | mono(meth)acryloxypropyl terminated mono-n-butyl terminated polydiethylsiloxane |
| 5 | mono(meth)acryloxypropyl terminated mono-n-methyl terminated polydiethylsiloxane |
| 6 | mono(meth)acrylamidoalkylpolydialkysiloxanes |
| 7 | mono(meth)acryloxyalkyl terminated mono-alkyl polydiarylsiloxanes |
| 8 | 3-methacryloxypropyltris(trimethylsiloxy)silane (TRIS) |
| 9 | 3-methacryloxypropylbis(trimethylsiloxy)methylsilane |
| 10 | 3-methacryloxypropylpentamethyl disiloxane |
| 11 | mono(meth)acrylamidoalkylpolydialkylsiloxanes |
| 12 | mono(meth)acrylamidoalkyl polydimethylsiloxanes |
| 13 | N-(2,3-dihydroxypropane)-N'-(propyl tetra(dimethylsiloxy) dimethylbutylsilane)acrylamide |
| 14 | N-[3-tris(trimethylsiloxy)silyl]-propyl acrylamide (TRIS-Am) |
| 15 | 2-hydroxy-3-[3-methyl-3,3-di(trimethylsiloxy)silylpropoxy]-propyl methacrylate (SiMAA) |
| 16 | 2-hydroxy-3-methacryloxypropyloxypropyl-tris(trimethylsiloxy)silane |
| 17 | 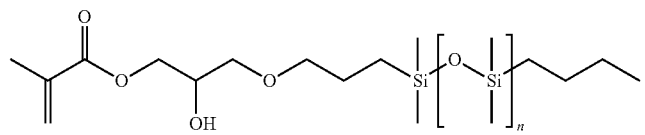 mono-(2-hydroxy-3-methacryloxypropyloxy)-propyl terminated mono-n-butyl terminated polydimethylsiloxanes (OH-mPDMS) (containing from 4 to 30, or from 4 to 20, or from 4 to 15 SiO repeat units) |
| 18 | 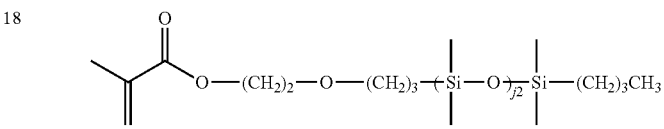 |
| 19 | 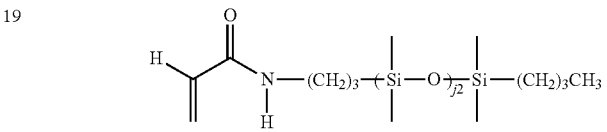 |
| 20 | 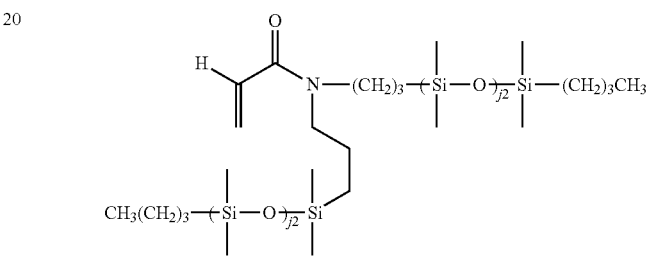 |

TABLE A-continued

21
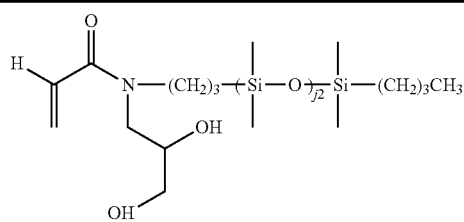

22
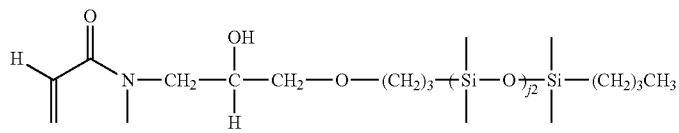

23
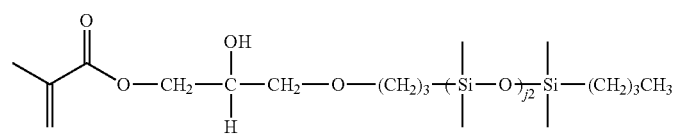

24
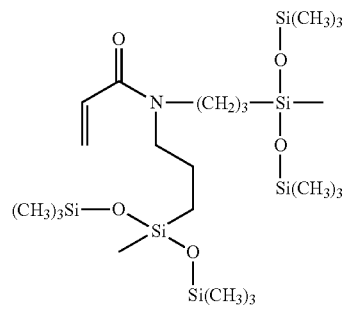

Additional non-limiting examples of suitable silicone-containing components are listed in Table B. Unless otherwise indicated, j2 where applicable is preferably from 1 to 100, more preferably from 3 to 40, or still more preferably from 3 to 15. In compounds containing j1 and j2, the sum of j1 and j2 is preferably from 2 to 100, more preferably from 3 to 40, or still more preferably from 3 to 15.

TABLE B

25
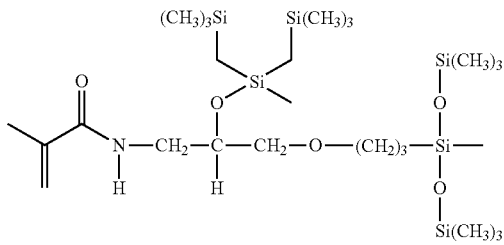

26
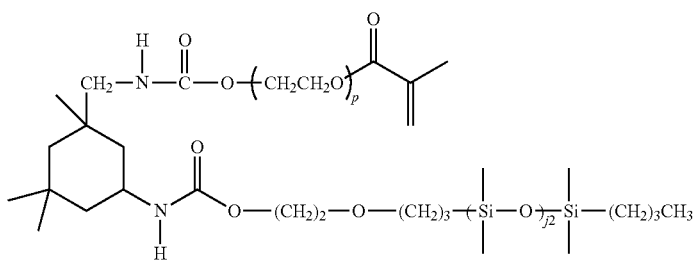

p is 1 to 10

TABLE B-continued
27 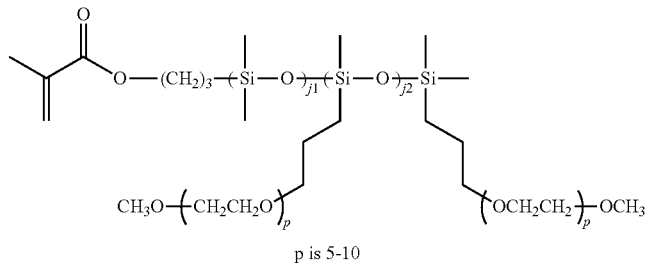
p is 5-10
28 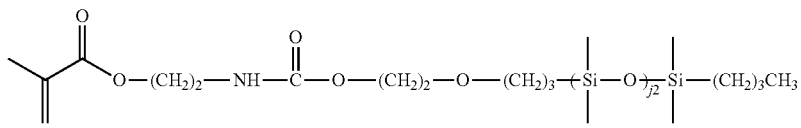
29 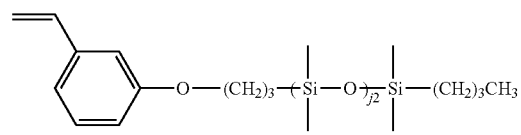
30  1,3-bis[4-(vinyloxycarbonyloxy)but-1-yl]tetramethyl-disiloxane
31  3-(vinyloxycarbonylthio)propyl-[tris(trimethylsiloxy)silane]
32  3-[tris(trimethylsiloxy)silyl]propyl allyl carbamate
33  3-[tris(trimethylsiloxy)silyl]propyl vinyl carbamate
34  tris(trimethylsiloxy)silylstyrene (Styryl-TRIS)
35 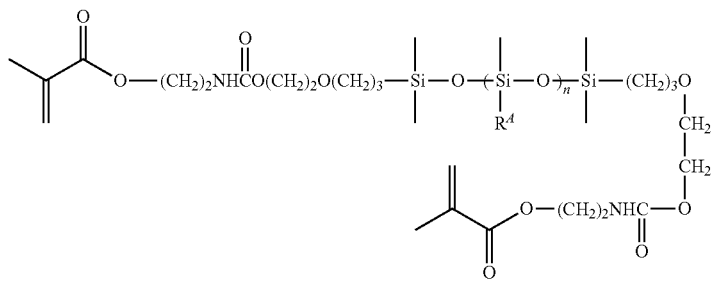
$R^A = CH_3$ (a) or $CH_2CH_2CF_3$ (b) or
$CH_2-(CH_2)_2-[OCH_2CH_2]_{1-10}-OCH_3$
(c); a + b + c = n
36 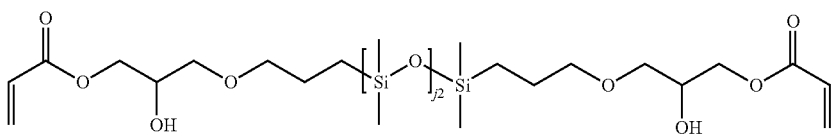
37 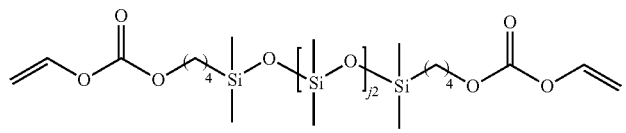
38 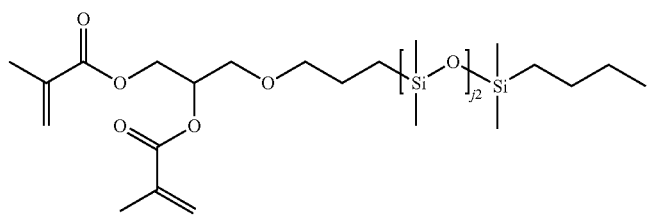

TABLE B-continued

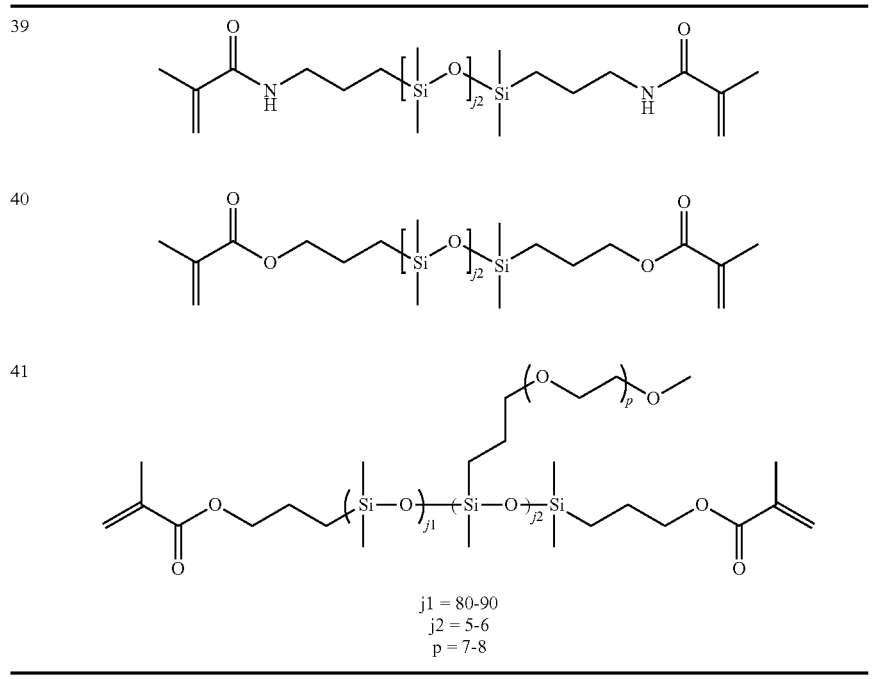

39

40

41 j1 = 80-90
j2 = 5-6
p = 7-8

Mixtures of silicone-containing components may be used. By way of example, suitable mixtures may include, but are not limited to: a mixture of mono-(2-hydroxy-3-methacryloxypropyloxy)-propyl terminated mono-n-butyl terminated polydimethylsiloxane (OH-mPDMS) having different molecular weights, such as a mixture of OH-mPDMS containing 4 and 15 SiO repeat units; a mixture of OH-mPDMS with different molecular weights (e.g., containing 4 and 15 repeat SiO repeat units) together with a silicone based crosslinker, such as bis-3-acryloxy-2-hydroxypropyloxypropyl polydimethylsiloxane (ac-PDMS); a mixture of 2-hydroxy-3-[3-methyl-3,3-di(trimethylsiloxy)silylpropoxy]-propyl methacrylate (SiMAA) and mono-methacryloxypropyl terminated mono-n-butyl terminated polydimethylsiloxane (mPDMS), such as mPDMS 1000.

Silicone-containing components for use in the invention may have an average molecular weight of from about 400 to about 4000 daltons.

The silicone containing component(s) may be present in amounts up to about 95 weight %, or from about 10 to about 80 weight %, or from about 20 to about 70 weight %, based upon all reactive components of the reactive mixture (excluding diluents).

The reactive mixture may include at least one polyamide as a wetting agent. As used herein, the term "polyamide" refers to polymers and copolymers comprising repeating units containing amide groups. The polyamide may comprise cyclic amide groups, acyclic amide groups and combinations thereof and may be any polyamide known to those of skill in the art. Acyclic polyamides comprise pendant acyclic amide groups and are capable of association with hydroxyl groups. Cyclic polyamides comprise cyclic amide groups and are capable of association with hydroxyl groups.

Examples of suitable acyclic polyamides include polymers and copolymers comprising repeating units of Formulae G1 and G2:

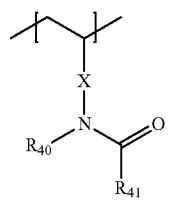

Formula G1

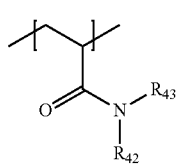

Formula G2 wherein X is a direct bond, —(CO)—, or —(CONHR$_{44}$)—, wherein R$_{44}$ is a C$_1$ to C$_3$ alkyl group; R$_{40}$ is selected from H, straight or branched, substituted or unsubstituted C$_1$ to C$_4$ alkyl groups; R$_{41}$ is selected from H, straight or branched, substituted or unsubstituted C$_1$ to C$_4$ alkyl groups, amino groups having up to two carbon atoms, amide groups having up to four carbon atoms, and alkoxy groups having up to two carbon groups; R$_{42}$ is selected from H, straight or branched, substituted or unsubstituted C$_1$ to C$_4$ alkyl groups; or methyl, ethoxy, hydroxyethyl, and hydroxymethyl; R$_{43}$ is selected from H, straight or branched, substituted or unsubstituted C$_1$ to C$_4$ alkyl groups; or methyl, ethoxy, hydroxyethyl, and hydroxymethyl; wherein the number of carbon atoms in R$_{40}$ and R$_{41}$ taken together is 8 or less, including 7, 6, 5, 4, 3, or less; and wherein the number of carbon atoms in R$_{42}$ and R$_{43}$ taken together is 8 or less, including 7, 6, 5, 4, 3, or less. The number of carbon atoms in R$_{40}$ and R$_{41}$ taken together may be 6 or less or 4 or less. The number of carbon atoms in R$_{42}$ and R$_{43}$ taken together may be 6 or less. As used herein substituted alkyl groups include alkyl groups substituted with an amine, amide, ether, hydroxyl, carbonyl or carboxy groups or combinations thereof.

$R_{40}$ and $R_{41}$ may be independently selected from H, substituted or unsubstituted $C_1$ to $C_2$ alkyl groups. X may be a direct bond, and $R_{40}$ and $R_{41}$ may be independently selected from H, substituted or unsubstituted $C_1$ to $C_2$ alkyl groups. $R_{42}$ and $R_{43}$ can be independently selected from H, substituted or unsubstituted $C_1$ to $C_2$ alkyl groups, methyl, ethoxy, hydroxyethyl, and hydroxymethyl.

The acyclic polyamides of the present invention may comprise a majority of the repeating units of Formula LV or Formula LVI, or the acyclic polyamides can comprise at least 50 mole percent of the repeating unit of Formula G or Formula G1, including at least 70 mole percent, and at least 80 mole percent. Specific examples of repeating units of Formula G and Formula G1 include repeating units derived from N-vinyl-N-methylacetamide, N-vinylacetamide, N-vinyl-N-methylpropionamide, N-vinyl-N-methyl-2-methylpropionamide, N-vinyl-2-methyl-propionamide, N-vinyl-N, N'-dimethylurea, N, N-dimethylacrylamide, methacrylamide, and acyclic amides of Formulae G2 and G3:

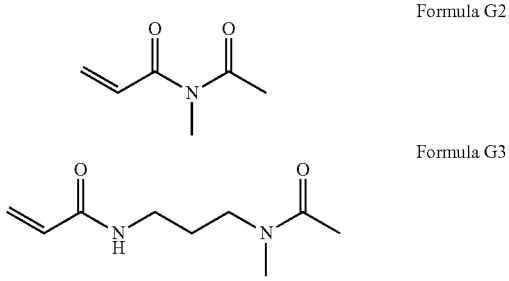

Formula G2

Formula G3

Examples of suitable cyclic amides that can be used to form the cyclic polyamides of include α-lactam, β-lactam, γ-lactam, δ-lactam, and ε-lactam. Examples of suitable cyclic polyamides include polymers and copolymers comprising repeating units of Formula G4:

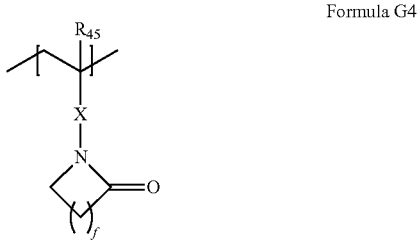

Formula G4 wherein $R_{45}$ is a hydrogen atom or methyl group; wherein f is a number from 1 to 10; wherein X is a direct bond, —(CO)—, or —(CONHR$_{46}$)—, wherein $R_{46}$ is a $C_1$ to $C_3$ alkyl group. In Formula LIX, f may be 8 or less, including 7, 6, 5, 4, 3, 2, or 1. In Formula G4, f may be 6 or less, including 5, 4, 3, 2, or 1. In Formula G4, f may be from 2 to 8, including 2, 3, 4, 5, 6, 7, or 8. In Formula LIX, f may be 2 or 3. When X is a direct bond, f may be 2. In such instances, the cyclic polyamide may be polyvinylpyrrolidone (PVP).

The cyclic polyamides of the present invention may comprise 50 mole percent or more of the repeating unit of Formula G4, or the cyclic polyamides can comprise at least 50 mole percent of the repeating unit of Formula G4, including at least 70 mole percent, and at least 80 mole percent.

The polyamides may also be copolymers comprising repeating units of both cyclic and acyclic amides. Additional repeating units may be formed from monomers selected from hydroxyalkyl(meth)acrylates, alkyl(meth)acrylates, other hydrophilic monomers and siloxane substituted (meth)acrylates. Any of the monomers listed as suitable hydrophilic monomers may be used as co-monomers to form the additional repeating units. Specific examples of additional monomers which may be used to form polyamides include 2-hydroxyethyl(meth)acrylate, vinyl acetate, acrylonitrile, hydroxypropyl(meth)acrylate, methyl(meth)acrylate and hydroxybutyl(meth)acrylate, dihydroxypropyl(meth)acrylate, polyethylene glycol mono(meth)acrylate, and the like and mixtures thereof. Ionic monomers may also be included. Examples of ionic monomers include (meth)acrylic acid, N-[(ethenyloxy)carbonyl]-β-alanine (VINAL, CAS #148969-96-4), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT, carboxybetaine; CAS 79704-35-1), 1-propanaminium, N,N-dimethyl-N-[3-[(1-oxo-2-propen-1-yl)amino]propyl]-3-sulfo-, inner salt (SBT, sulfobetaine, CAS 80293-60-3), 3,5-Dioxa-8-aza-4-phosphaundec-10-en-1-aminium, 4-hydroxy-N,N,N-trimethyl-9-oxo-, inner salt, 4-oxide (9CI) (PBT, phosphobetaine, CAS 163674-35-9, 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS).

The reactive monomer mixture may comprise both an acyclic polyamide and a cyclic polyamide or copolymers thereof. The acyclic polyamide can be any of those acyclic polyamides described herein or copolymers thereof, and the cyclic polyamide can be any of those cyclic polyamides described herein or copolymers thereof. The polyamide may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof. The polyamide may be a mixture of PVP (e.g., PVP K90) and PVMA (e.g., having a $M_w$ of about 570 KDa).

The total amount of all polyamides in the reactive mixture may be in the range of between 1 weight percent and about 35 weight percent, including in the range of about 1 weight percent to about 15 weight percent, and in the range of about 5 weight percent to about 15 weight percent, in all cases, based on the total weight of the reactive components of the reactive monomer mixture.

Without intending to be bound by theory, when used with a silicone hydrogel, the polyamide functions as an internal wetting agent. The polyamides of the present invention may be non-polymerizable, and in this case, are incorporated into the silicone hydrogels as semi-interpenetrating networks. The polyamides are entrapped or physically retained within the silicone hydrogels. Alternatively, the polyamides of the present invention may be polymerizable, for example as polyamide macromers or prepolymers, and in this case, are covalently incorporated into the silicone hydrogels. Mixtures of polymerizable and non-polymerizable polyamides may also be used.

When the polyamides are incorporated into the reactive monomer mixture they may have a weight average molecular weight of at least 100,000 daltons; greater than about 150,000; between about 150,000 to about 2,000,000 daltons; between about 300,000 to about 1,800,000 daltons. Higher molecular weight polyamides may be used if they are compatible with the reactive monomer mixture.

It is generally desirable to add one or more cross-linking agents, also referred to as cross-linking monomers, multifunctional macromers, and prepolymers, to the reactive mixture. The cross-linking agents may be selected from bifunctional crosslinkers, trifunctional crosslinkers, tetrafunctional crosslinkers, and mixtures thereof, including silicone-containing and non-silicone containing cross-linking agents. Non-silicone-containing cross-linking agents include ethylene glycol dimethacrylate (EGDMA), tetraethylene glycol dimethacrylate (TEGDMA), trimethylolpropane trimethacrylate (TMPTMA), triallyl cyanurate (TAC), glycerol trimethacrylate, methacryloxyethyl vinylcarbonate (HEMAVc), allylmethacrylate, methylene bisacrylamide (MBA), and polyethylene glycol dimethacrylate wherein the polyethylene glycol has a molecular weight up to about 5000 Daltons. The cross-linking agents are used in the usual amounts, e.g., from about 0.000415 to about 0.0156 mole per 100 grams of reactive Formulas in the reactive mixture. Alternatively, if the hydrophilic monomers and/or the silicone-containing components are multifunctional by molecular design or because of impurities, the addition of a cross-linking agent to the reactive mixture is optional. Examples of hydrophilic monomers and macromers which can act as the cross-linking agents and when present do not require the addition of an additional cross-linking agent to the reactive mixture include (meth)acrylate and (meth)acrylamide end-capped polyethers. Other cross-linking agents will be known to one skilled in the art and may be used to make the silicone hydrogel of the present invention.

It may be desirable to select crosslinking agents with similar reactivity to one or more of the other reactive components in the formulation. In some cases, it may be desirable to select a mixture of crosslinking agents with different reactivity in order to control some physical, mechanical or biological property of the resulting silicone hydrogel. The structure and morphology of the silicone hydrogel may also be influenced by the diluent(s) and cure conditions used.

Multifunctional silicone-containing components, including macromers, cross-linking agents, and prepolymers, may also be included to further increase the modulus and retain tensile strength. The silicone containing cross-linking agents may be used alone or in combination with other cross-linking agents. An example of a silicone containing component which can act as a cross-linking agent and, when present, does not require the addition of a crosslinking monomer to the reactive mixture includes α, ω-bismethacryloxypropyl polydimethylsiloxane. Another example is bis-3-acryloxy-2-hydroxypropyloxypropyl polydimethylsiloxane (ac-PDMS).

Cross-linking agents that have rigid chemical structures and polymerizable groups that undergo free radical polymerization may also be used. Non-limiting examples of suitable rigid structures include cross-linking agents comprising phenyl and benzyl ring, such are 1,4-phenylene diacrylate, 1,4-phenylene dimethacrylate, 2,2-bis(4-methacryloxyphenyl)-propane, 2,2-bis[4-(2-acryloxyethoxy)phenyl]propane, 2,2-bis[4-(2-hydroxy-3-methacryloxypropoxy)-phenyl]propane, and 4-vinylbenzyl methacrylate, and combinations thereof. Rigid crosslinking agents may be included in amounts between about 0.5 and about 15, or 2-10, 3-7 based upon the total weight of all of the reactive components. The physical and mechanical properties of the silicone hydrogels of the present invention may be optimized for a particular use by adjusting the components in the reactive mixture.

As noted above, the reactive mixture may contain additional components such as, but not limited to, diluents, initiators, UV absorbers, visible light absorbers, photochromic compounds, pharmaceuticals, nutraceuticals, antimicrobial substances, tints, pigments, copolymerizable dyes, non-polymerizable dyes, release agents, and combinations thereof. Preferably, the reactive mixture may contain a compound that imparts UV absorption properties to the lens. Suitable UV absorbing compounds are known in the art, and fall into several classes which include, but are not limited to, benzophenones, benzotriazoles, triazines, substituted acrylonitriles, salicylic acid derivatives, benzoic acid derivatives, cinnamic acid derivatives, chalcone derivatives, dypnone derivatives, crotonic acid derivatives, or any mixtures thereof. A preferred class of UV absorbing compound is benzotriazoles, such as Norbloc (2-(2'-hydroxy-5-methacryloxyethylphenyl)-2H-benzotriazole).

Classes of suitable diluents for silicone hydrogel reactive mixtures include alcohols having 2 to 20 carbon atoms, amides having 10 to 20 carbon atoms derived from primary amines and carboxylic acids having 8 to 20 carbon atoms. The diluents may be primary, secondary, and tertiary alcohols.

Generally, the reactive components are mixed in a diluent to form a reactive mixture. Suitable diluents are known in the art. For silicone hydrogels, suitable diluents are disclosed in WO 03/022321 and U.S. Pat. No. 6,020,445, the disclosure of which is incorporated herein by reference. Classes of suitable diluents for silicone hydrogel reactive mixtures include alcohols having 2 to 20 carbons, amides having 10 to 20 carbon atoms derived from primary amines, and carboxylic acids having 8 to 20 carbon atoms. Primary and tertiary alcohols may be used. Preferred classes include alcohols having 5 to 20 carbons and carboxylic acids having 10 to 20 carbon atoms. Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)-propylbis(trimethylsiloxy)
methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino) ethanol mixtures thereof and the like. Examples of amide diluents include N,N-dimethyl propionamide and dimethyl acetamide.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like. If a diluent is present, generally there are no particular restrictions with respect to the amount of diluent present. When diluent is used, the diluent may be present in an amount in the range of about 2 to about 70 weight percent, including in the range of about 5 to about 50 weight percent, and in the range of about 15 to about 40 weight percent, based on the total weight of the reactive mixtures (including reactive and nonreactive Formulas). Mixtures of diluents may be used.

A polymerization initiator may be used in the reactive mixture. The polymerization initiator may include, for instance, at least one of lauroyl peroxide, benzoyl peroxide, iso-propyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4,4-trimethylpentyl phosphine oxide (DMBAPO), bis(2,4,6-trimethylbenzoyl)-phenyl phosphine oxide (Irgacure 819), 2,4,6-trimethylbenzyldiphenyl phos-phine oxide and 2,4,6-trimethylbenzoyl diphenylphosphine oxide, benzoin methyl ester and a combination of cam-phorquinone and ethyl 4-(N,N-dimethylamino)benzoate.

Commercially available (from IGM Resins B.V., The Netherlands) visible light initiator systems include Irgacure® 819, Irgacure® 1700, Irgacure® 1800, Irgacure® 819, Irgacure® 1850 and Lucrin® TPO initiator. Commercially available (from IGM Resins B.V.) UV photoinitiators include Darocur® 1173 and Darocur® 2959. These and other photoinitiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998. The initiator is used in the reactive mixture in effective amounts to initiate photopolymerization of the reactive mixture, e.g., from about 0.1 to about 2 parts by weight per 100 parts of reactive monomer mixture. Polymerization of the reactive mixture can be initiated using the appropriate choice of heat or visible or ultraviolet light or other means depending on the polymerization initiator used. Alternatively, initiation can be conducted using e-beam without a photoinitiator. However, when a photoinitiator is used, the preferred initiators are bisacylphosphine oxides, such as bis(2,4,6-tri-methylbenzoyl)-phenyl phosphine oxide (Irgacure® 819) or a combination of 1-hydroxycyclohexyl phenyl ketone and bis(2,6-dimethoxybenzoyl)-2,4,4-trimethylpentyl phosphine oxide (DMBAPO).

Contact lenses containing the photosensitive chromophore of the invention preferably limit the transmission of HEV light. Thus, a contact lens containing a photosensitive chromophore may, for instance, transmit: from 0 percent to 70 percent of light across a wavelength range of 400 to 409 nm. The transmission of the contact lens across 400 to 409 nm may be at least 1 percent, or at least 2 percent, or at least 3 percent. The transmission of the contact lens at 400 to 409 nm may be 60 percent or less, or 50 percent or less, or 40 percent or less, or 30 percent or less, or 25 percent or less.

The contact lens containing the photosensitive chromophore may transmit from 10 percent to 95 percent of light across a wavelength range of 410 to 424 nm. The transmission of the contact lens at 410 to 424 nm may be at least 30 percent. The transmission of the contact lens across 410 to 424 nm may be up to 85 percent, or up to 75 percent.

The contact lens containing the photosensitive chromophore may transmit at least 40 percent of light across a wavelength range of 425 to 449 nm. The transmission of the contact lens across 425 to 449 nm may be at least 50 percent.

The contact lens containing the photosensitive chromophore may transmit at least 80 percent of light across a wavelength of 450 to 800 nm. The transmission of the contact lens across 450 to 800 nm may be at least 90 percent.

The contact lens containing the photosensitive chromophore may transmit 45 percent or less of light across a wavelength range of 280 to 399 nm. The transmission of the contact lens across 280 to 399 nm may be 35 percent or less, or 25 percent or less, or 20 percent or less, or 10 percent or less, or 5 percent or less. The transmission in the UV range of the spectrum may be achieved by the inclusion of a UV filtering compound in the lens, for instance a benzotriazole compound such as Norbloc.

Preferably, the photosensitive chromophore in the contact lens is non-photochromic.

In addition to a contact lens containing a photosensitive chromophore, the contact lens system of the invention also includes a package surrounding the contact lens. The package has a transmittance of no more than 99 percent at each active wavelength exhibited by the photosensitive chromophore. The package may be a primary package or a secondary package.

The package for use in the lens system of the invention protects the photosensitive chromophore in the contact lens from photodegradation. The protection afforded by the package may be complete (thus the photosensitive chromophore exhibits no, or very limited, photodegradation while in the package), or it may be partial (the photosensitive chromophore may partially photodegrade, but not to the same extent as would occur in the absence of the package). Thus the contact lens containing the photosensitive chromophore is photostabilized by the package.

The package of the invention protects the photosensitive chromophore by at least partially blocking light at every active wavelength of the photosensitive chromophore. The blocking by the package may be described in terms of the percent transmittance of the package at the active wavelength. The package of the invention has a percent transmittance of no more than 99 percent, alternatively no more than 80 percent, or alternatively no more than 50 percent, at each active wavelength. Preferably the package's percent transmittance at each active wavelength is equal to or less than the photosensitive chromophore's percent transmittance at the same active wavelength.

Various techniques may be used to provide a package that exhibits the desired percent transmittance at the active wavelengths. For instance, the package may contain its own light absorbing compound. The light absorbing compound may, for instance, have the same chemical structure of chromophore as the photosensitive chromophore of the contact lens. Preferably, however, the package utilizes a chromophore that is less photosensitive than the chromophore of the contact lens. An exemplary class of chromophoric compounds for use in the package include thioxanthene derivatives, such as described in pre-grant publication number US20190271798, which is incorporated herein by reference. A specific example of such light absorbing compounds is: 2-(2-cyano-2-(9H-thioxanthen-9-ylidene)acetamido)ethyl methacrylate. The light absorbing compound may be incorporated in the package in a number of ways, for instance by copolymerizing or compounding it with the other materials used to make the package, or including it in a coating that is applied to one or both surfaces of the package.

Curing of Hydrogels and Manufacture of Lens

The reactive mixtures may be formed by any of the methods known in the art, such as shaking or stirring, and used to form polymeric articles or devices by known methods. The reactive components are mixed together either with or without a diluent to form the reactive mixture.

For example, contact lenses may be prepared by mixing reactive components, and, optionally, diluent(s), with a polymerization initiator and curing by appropriate conditions to form a product that can be subsequently formed into the appropriate shape by lathing, cutting, and the like. Alternatively, the reactive mixture may be placed in a mold and subsequently cured into the appropriate article.

A method of making a molded contact lens, such as a conventional or silicone hydrogel contact lens, may comprise: preparing a reactive monomer mixture; transferring the reactive monomer mixture onto a first mold; placing a second mold on top the first mold filled with the reactive monomer mixture; and curing the reactive monomer mixture by free radical copolymerization to form the hydrogel in the shape of a contact lens.

The reactive mixture may be cured via any known process for molding the reactive mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. The contact lenses of this invention may be formed by the direct molding of the hydrogels, which is economical, and enables precise control over the final shape of the hydrated lens. For this method, the reactive mixture is placed in a mold having the shape of the final desired hydrogel and the reactive mixture is subjected to conditions whereby the monomers polymerize, thereby producing a polymer in the approximate shape of the final desired product.

After curing, the lens may be subjected to extraction to remove unreacted components and release the lens from the lens mold. The extraction may be done using conventional extraction fluids, such organic solvents, such as alcohols or may be extracted using aqueous solutions.

Aqueous solutions are solutions which comprise water. The aqueous solutions of the present invention may comprise at least about 20 weight percent water, or at least about 50 weight percent water, or at least about 70 weight percent water, or at least about 95 weight percent water. Aqueous solutions may also include additional water soluble Formulas such as inorganic salts or release agents, wetting agents, slip agents, pharmaceutical and nutraceutical Formulas, combinations thereof and the like. Release agents are compounds or mixtures of compounds which, when combined with water, decrease the time required to release a contact lens from a mold, as compared to the time required to release such a lens using an aqueous solution that does not comprise the release agent. The aqueous solutions may not require special handling, such as purification, recycling or special disposal procedures.

Extraction may be accomplished, for example, via immersion of the lens in an aqueous solution or exposing the lens to a flow of an aqueous solution. Extraction may also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leaching or extraction aid in the aqueous solution to a level sufficient to facilitate adequate removal of unreacted components from the lens. The foregoing may be conducted in batch or continuous processes, with or without the addition of heat, agitation or both.

Application of physical agitation may be desired to facilitate leach and release. For example, the lens mold part to which a lens is adhered can be vibrated or caused to move back and forth within an aqueous solution. Other methods may include ultrasonic waves through the aqueous solution.

The lens may be placed and sealed in a primary package by known methods. The lenses may be sterilized by known means such as, but not limited to, autoclaving. The finished lens in its primary package may then be placed in a secondary package. A group of lenses in primary packages may be placed in the same secondary package.

As indicated above, preferred contact lenses are soft hydrogel contact lenses. The transmission wavelengths and percentages described herein may be measured on various thicknesses of lenses using known methodologies. By way of example, a preferred center thickness for measuring transmission spectra in a soft contact lens may be from 70 to 100 microns. Typically, the transmission measurement may be made through the center of the lens using, for instance, a 4 nm instrument slit width.

As discussed above, the invention provides a contact lens system comprising a contact lens that contains a photosensitive chromophore and a package surrounding the contact lens. The package at least partially blocks the wavelengths of light that could otherwise photodegrade the chromophore. The package therefore is capable of stabilizing the photosensitive chromophore against photodegradation. Advantageously, the package, while protecting the chromophore, may transmit light of other wavelengths, thus allowing the contents of the package to be visible, for instance to the naked eye and/or to testing equipment that is used during the lens production process.

A further advantage of the invention is that the level of protection afforded by the package can be modulated by changing the amount of light that it blocks. This allows a manufacturer to better control or modulate the shelf life of its products. Products that do not require long shelf life could be contained in a package that only partially blocks the light that could otherwise photodegrade the chromophore. On the other hand, if longer shelf life is desired, a package that provides greater blocking of the wavelengths that could otherwise photodegrade the chromophore may be used. Longer shelf life may result, for instance, in reduced product waste.

Preferably, the use of the package in the invention protects the contact lens containing the photosensitive chromophore such that, following exposure to light under ICH guideline Q1B, the lens exhibits exhibit less than 40 percent, or 35 percent or less, or 30 percent or less, or 10 percent or less, or 7 percent or less, or 5 percent or less, or 2 percent or less, or 0.5 percent or less, change in its average transmission over a wavelength range of 400 to 450 nm. Such changes may be calculated as the absolute value of the difference between the average transmission (over the 400 to 450 nm wavelength range) of a lens protected from light exposure versus a lens exposed under the ICH guideline Q1B.

Contact lenses according to the invention may also exhibit the following properties. All values are prefaced by "about," and the devices may have any combination of the listed properties. The properties may be determined by methods known to those skilled in the art, for instance as described in United States pre-grant publication US20180037690, which is incorporated herein by reference.

Water concentration %: at least 20%, or at least 25% and up to 80% or up to 70%

Haze: 30% or less, or 10% or less

Advancing dynamic contact angle (Wilhelmy plate method): 100° or less, or 80° or less; or 50° or less Tensile Modulus (psi): 120 or less, or 80 to 120

Oxygen permeability (Dk, barrers): at least 80, or at least 100, or at least 150, or at least 200

Elongation to Break: at least 100

For ionic silicon hydrogels, the following properties may also be preferred (in addition to those recited above):

Lysozyme uptake (µg/lens): at least 100, or at least 150, or at least 500, or at least 700

Polyquaternium 1 (PQ1) uptake (%): 15 or less, or 10 or less, or 5 or less

Some embodiments of the invention will now be described in detail in the following Examples.

EXAMPLES

Example 1: Test Lens Preparation

Test contact lenses based on senofilcon A (without UV absorbing compounds) were prepared by polymerization/molding of a reactive mixture containing, in addition to other device forming monomers and additives, 2 weight percent, based on the total of all reactive components in the reactive mixture, of 2-(4-acetyl-3-amino-2,6-dimethoxyphenoxy)ethyl methacrylate. The resulting test lenses were released from the lens molds at room temperature in 70:30 isopropyl alcohol: water and hydrated in 70:30 isopropyl alcohol: water, before transfer into a standard borate buffer packing solution. Test lenses were then autoclaved for 30 minutes in packing solution before long term storage in heat-sealed contact lens blisters with standard packing solution.

The light transmittance of contact lenses were characterized using a Cary 6000 Agilent Technologies UV-VIS-NIR spectrometer. Standard borate buffer packing solution is filtered to remove any particles that may negatively impact spectra collection. Lenses were mounted in a lens holder with an aperture dimension of approximately 6 mm×12 mm before the assembly was inserted into quartz spectrophotometer cuvette, 45 mm×12.2 mm with a 10 mm path length. A matching assembly is prepared for the reference cell without a contact lens in the lens holder. A UV/Vis spectrum of an Example 1 test lens is shown in FIG. 1.

Extended exposure of a lens containing the chromophore described above to light demonstrates its photosensitivity. Thus, senofilcon A type lenses containing 2 weight percent of 2-(4-acetyl-3-amino-2,6-dimethoxyphenoxy)ethyl methacrylate (these lenses, unlike the test lenses of FIG. 1, also contained a UV absorbing compound) were tested. The lenses may be prepared as described in U.S. patent application Ser. No. 16/398,722. The lenses were packaged in a clear blister pack, and then subjected to ICH guideline Q1B conditions described above. These were compared to lenses not exposed to Q1B light conditions. The UV-Visible transmission spectra are shown in FIG. 2.

Figure 2:
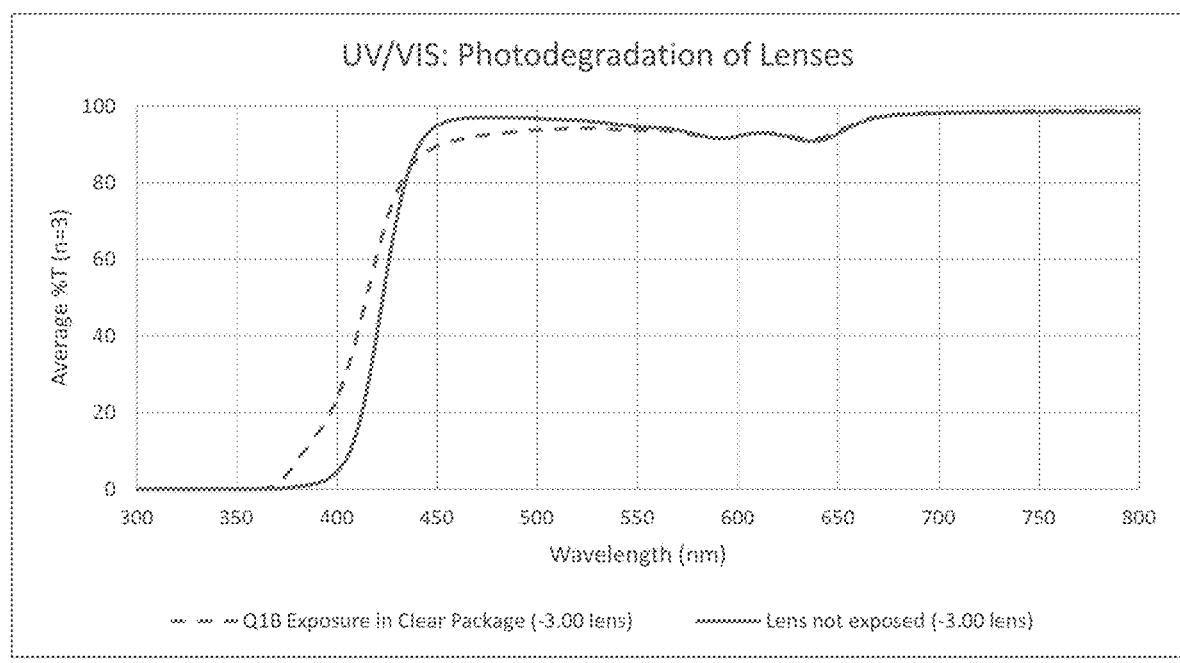
FIG. 2 is a UV/Vis transmission spectrum of a lens exposed to light under ICH guideline Q1B conditions compared to an unexposed lens.

FIG. 2 reveals the photosensitivity of the lenses after the light exposure. As can be seen, the ability of the lenses to maintain their high energy visible light filtering properties undesirably changed with the exposure. The average transmissions of the unexposed lens and the Q1B exposed lens over a 400-450 nm range were, respectively, about 53 percent and about 64 percent. The contact lens of FIG. 2 therefore exhibits an about 11 percent change in its average transmission over a wavelength range of 400 to 450 nm after exposure to light under ICH guideline Q1B conditions.

Example 2: Photostress Study

In this example, the effectiveness of at least partially blocking the light otherwise absorbed by the photosensitive chromophore at reducing its photodegradation is demonstrated.

Figure 3:
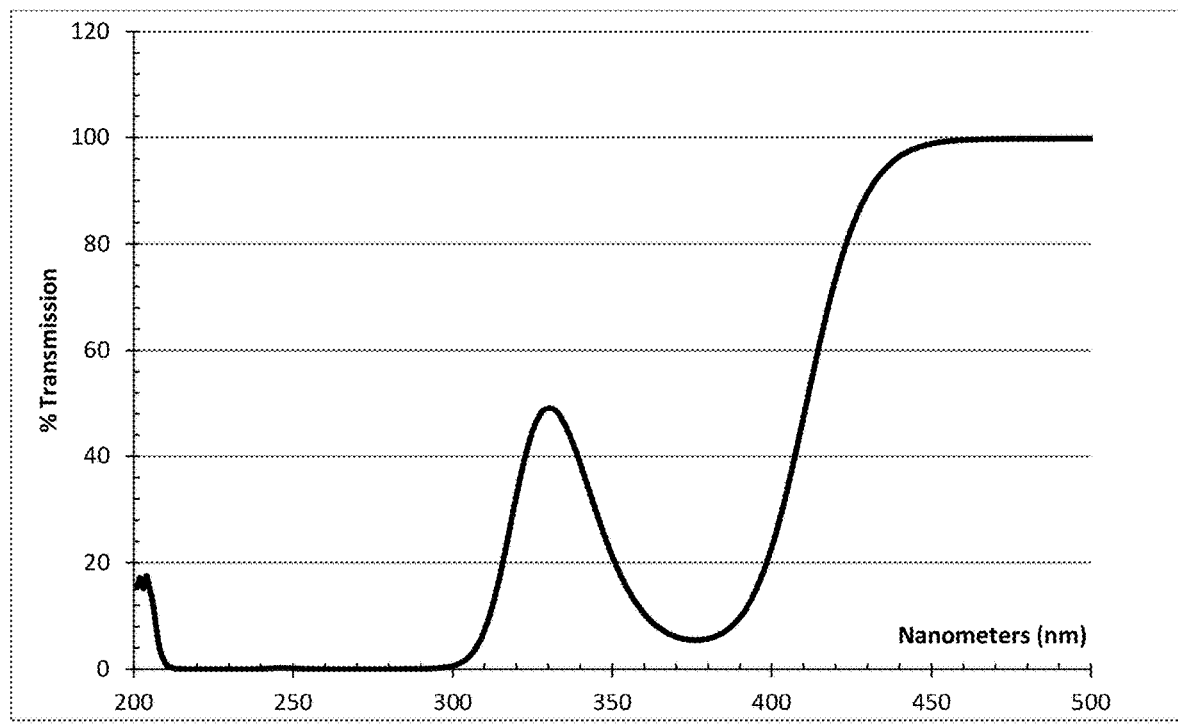
FIG. 3 is a UV/Vis spectrum of a light absorbing compound for protecting the test lens from photodegradation.

In this example, the protection is provided by the light absorbing compound 2-(2-cyano-2-(9H-thioxanthen-9-ylidene)acetamido)ethyl methacrylate ("LAC1"). A UV/Vis transmission spectrum of a 0.2 mM solution of LAC1 UV-VIS in methanol is shown in FIG. 3. As can be seen, LAC absorbs at each active wavelength of the chromophore used in the test lens of Example 1.

To simulate a package, a solution of 2 mM of LAC1 was prepared by adding the appropriate weighed powder to propylene glycol as solvent; the glass bottle was rolled overnight to completely dissolve the LAC1. A volume of 30 milliliters was required for each experimental test concentration of LAC1: 2 mM, 0.5 mM, and 0.1 mM solutions were prepared by serial dilution. Solutions were protected from light, prior to usage.

Figure 4:
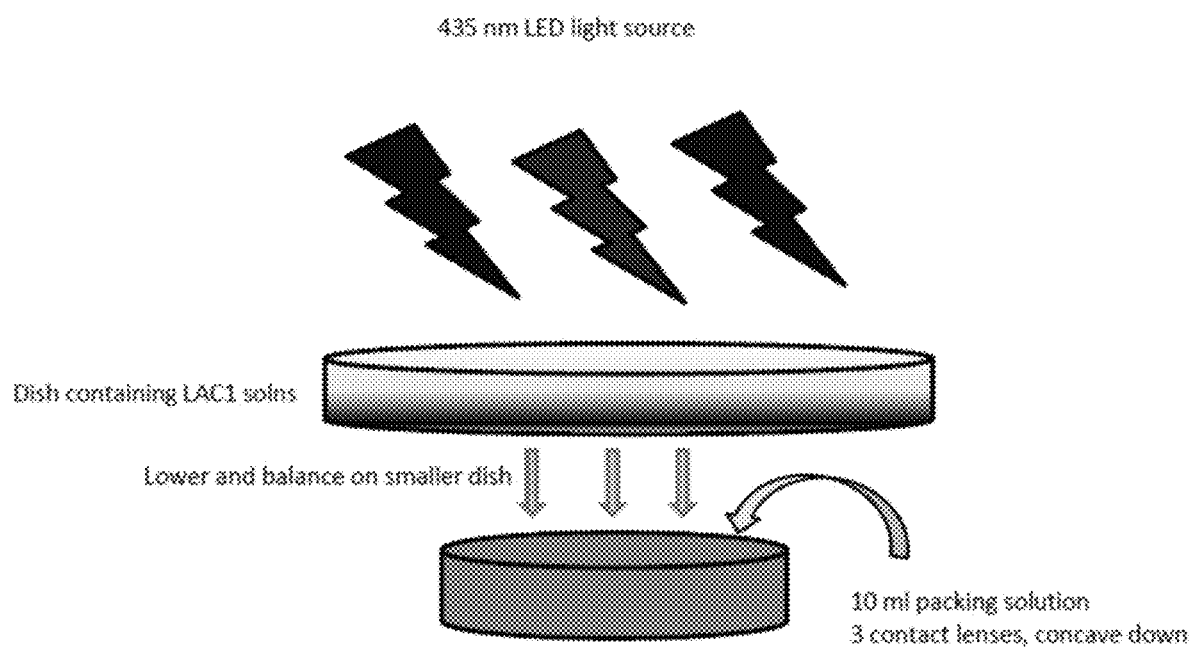
FIG. 4 is a schematic diagram of the apparatus used in Example 2.

Glass petri dish sets (60×15 mm and 100×10 mm) were purchased from Avantor; however, only the bottom dishes were used for the experiment. A smaller 60×15 mm dish for housing test contact lenses was covered with aluminum foil (Reynolds Consumer Products, LLC), with the foil covering the lip of the dish. The bottom 100×10 mm dishes were used as the reservoirs for the LAC1 solutions and were to be balanced on the smaller dish. This stacked assembly therefore allows light to pass through the dishes containing the LAC1 solutions but not through the sides of the smaller dish containing the test lenses. The dish is then illuminated with 435 nm LED as the light source. A schematic of the assembly is shown in FIG. 4.

A platform was positioned 7.5 inches from the LED panel. The LED intensity was adjusted to have an average of 20 mW/cm$^2$ across the platform. The assemblies with the four test solutions were organized on the platform, and the LEDs were illuminated for a total of 52 hours at room temperature. It should be noted that the lighting conditions of this example are more intense than the Q1B conditions discussed above and result in a faster and/or more pronounced effect on the photosensitive chromophore.

Figure 5:
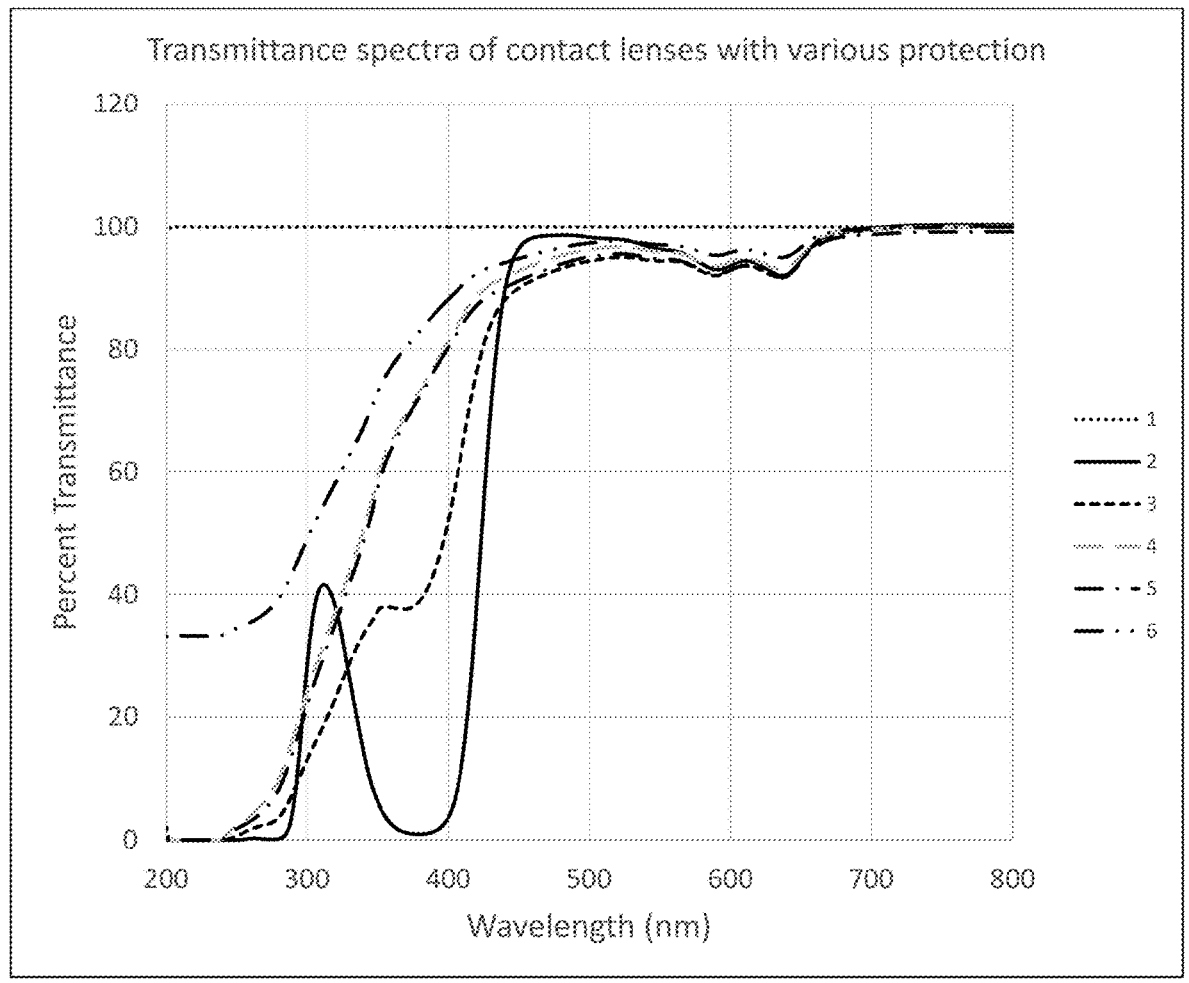
FIG. 5 shows UV/Vis spectral transmission curves of test lenses of Example 1 exposed to LED light, including those protected from photodegradation.

After exposure, the UV/Vis spectra of the test contact lenses were collected using a Cary 6000 Agilent Technologies UV-VIS-NIR spectrometer as discussed above. The UV/Vis spectra of the test lenses, exposed through various concentrations of LAC1, or through PG without LAC1 (the control), are shown in FIG. 5. FIG. 5 includes the spectral curve of an unexposed test lens.

In FIG. 5, curve 1 is the reference blank. Curve 2 is an unexposed test lens. Curve 3 is a test lens exposed through a 2 mM LAC1 solution overlay. Curve 4 is a test lens exposed through a 0.5 mM LAC1 solution overlay. Curve 5 is a test lens exposed through a 0.1 mM LAC1 solution overlay. And curve 6 is a test lens exposed through a 0 mM LAC1 solution overlay (i.e., propylene glycol solvent only).

As can be seen from FIG. 5, as the concentration of LAC1 is increased, less photodegradation of the lens, relative to an unexposed lens (curve 2), is observed. The difference in average transmission over a wavelength range of 400 to 450 nm between the exposed lenses relative to the unexposed lens is shown in Table 1. The average transmission of the unexposed lens over 400-450 nm is about 52%.

TABLE 1

| Overlay Solution | 400-450 nm average transmission | Ave transmission: diff from unexposed lens |
|---|---|---|
| 2 mM LAC1 | 77% | 25% |
| 0.5 mM LAC1 | 89% | 37% |
| 0.1 mM LAC1 | 87% | 35% |
| 0 mM LAC1 | 92% | 40% |

As demonstrated in Table 1, the LAC1 compound, which at least partially blocks the transmission of light at all of the wavelengths absorbed by the photosensitive chromophore of the test lens, protects the compound from photodegradation. The greater the blocking by the LAC1 (resulting from its increased concentration in solution), the greater the protection afforded. The data suggests that increased protection may be afforded by further increasing the level of blocking provided by the LAC1 compound (e.g., by increasing its concentration).

Example 3: Test Lens Preparation

Test contact lenses based on senofilcon A (without UV absorbing compounds) were prepared by polymerization/molding of a reactive mixture containing, in addition to other device forming monomers and additives, 2 weight percent, based on the total of all reactive components in the reactive mixture, of 2-((1-amino-8-oxo-5,6,7,8-tetrahydronaphthalen-2-yl)oxy)ethyl methacrylate. The resulting test lenses were released from the lens molds at room temperature in 70:30 isopropyl alcohol: water and hydrated in 70:30 isopropyl alcohol: water, before transfer into a standard borate buffer packing solution. Test lenses were then autoclaved for 30 minutes in packing solution before long term storage in heat-sealed contact lens blisters with standard packing solution.

Figure 6:
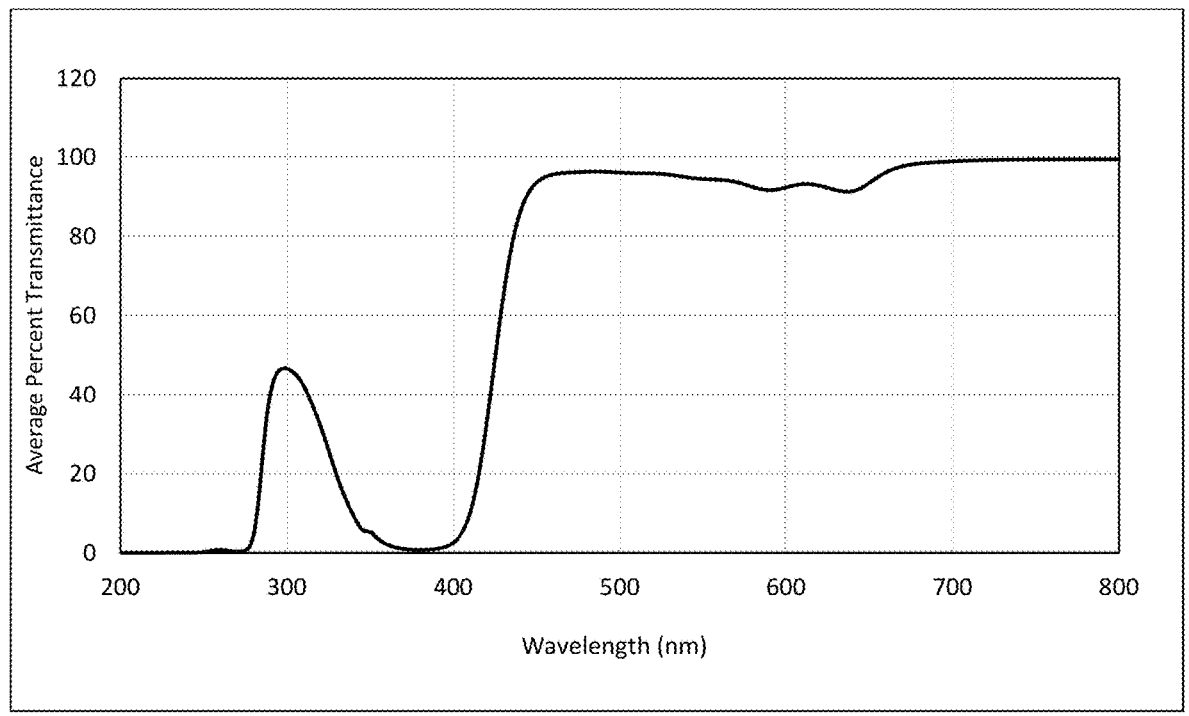
FIG. 6 is a UV/Vis transmission spectrum of a test lens according to Example 3.

The light transmittance of contact lenses was characterized using a Cary 6000 Agilent Technologies UV-VIS-NIR spectrometer. Standard borate buffer packing solution is filtered to remove any particles that may negatively impact spectra collection. Lenses were mounted in a lens holder with an aperture dimension of approximately 6 mm×12 mm before the assembly was inserted into quartz spectrophotometer cuvette, 45 mm×12.2 mm with a 10 mm path length. A matching assembly is prepared for the reference cell without a contact lens in the lens holder. A UV/Vis spectrum of an Example 3 test lens is shown in FIG. 6.

Example 4: Photostress Study

In this example, the effectiveness of at least partially blocking the light otherwise absorbed by the photosensitive chromophore at reducing its photodegradation is demonstrated.

In this example, the protection is provided by the light absorbing compound 2-(2-cyano-2-(9H-thioxanthen-9-ylidene)acetamido)ethyl methacrylate ("LAC1"). A UV/Vis transmission spectrum of a 0.2 mM solution of LAC1 UV-VIS in methanol is shown in FIG. 3. As can be seen, LAC absorbs at each active wavelength of the chromophore used in the test lens of Example 3.

To simulate a package, a solution of 2 mM of LAC1 was prepared by adding the appropriate weighed powder to propylene glycol as solvent; the glass bottle was rolled overnight to completely dissolve the LAC1. A volume of 30 milliliters was required for each experimental test concentration of LAC1: 2 mM, 0.5 mM, and 0.1 mM solutions were prepared by serial dilution. Solutions were protected from light, prior to usage.

Glass petri dish sets (60×15 mm and 100×10 mm) were purchased from Avantor; however, only the bottom dishes were used for the experiment. A smaller 60×15 mm dish for housing test contact lenses was covered with aluminum foil (Reynolds Consumer Products, LLC), with the foil covering the lip of the dish. The bottom 100×10 mm dishes were used as the reservoirs for the LAC1 solutions and were to be balanced on the smaller dish. This stacked assembly therefore allows light to pass through the dishes containing the LAB1 solutions but not through the sides of the smaller dish containing the test lenses. The dish is then illuminated with 435 nm LED as the light source. A schematic of the assembly is shown in FIG. 4.

A platform was positioned 7.5 inches from the LED panel. The LED intensity was adjusted to have an average of 20 mW/cm$^2$ across the platform. The assemblies with the four test solutions were organized on the platform, and the LEDs were illuminated for a total of 5 hours at room temperature.

After exposure, the UV/Vis spectra of the test contact lenses were collected using a Cary 6000 Agilent Technologies UV-VIS-NIR spectrometer as discussed above. The UV/Vis spectra of the test lenses, exposed through various concentrations of LAC1, or through PG without LAC1 (the control), are shown in FIG. 7. FIG. 7 includes the spectral curve of an unexposed test lens.

Figure 7A:
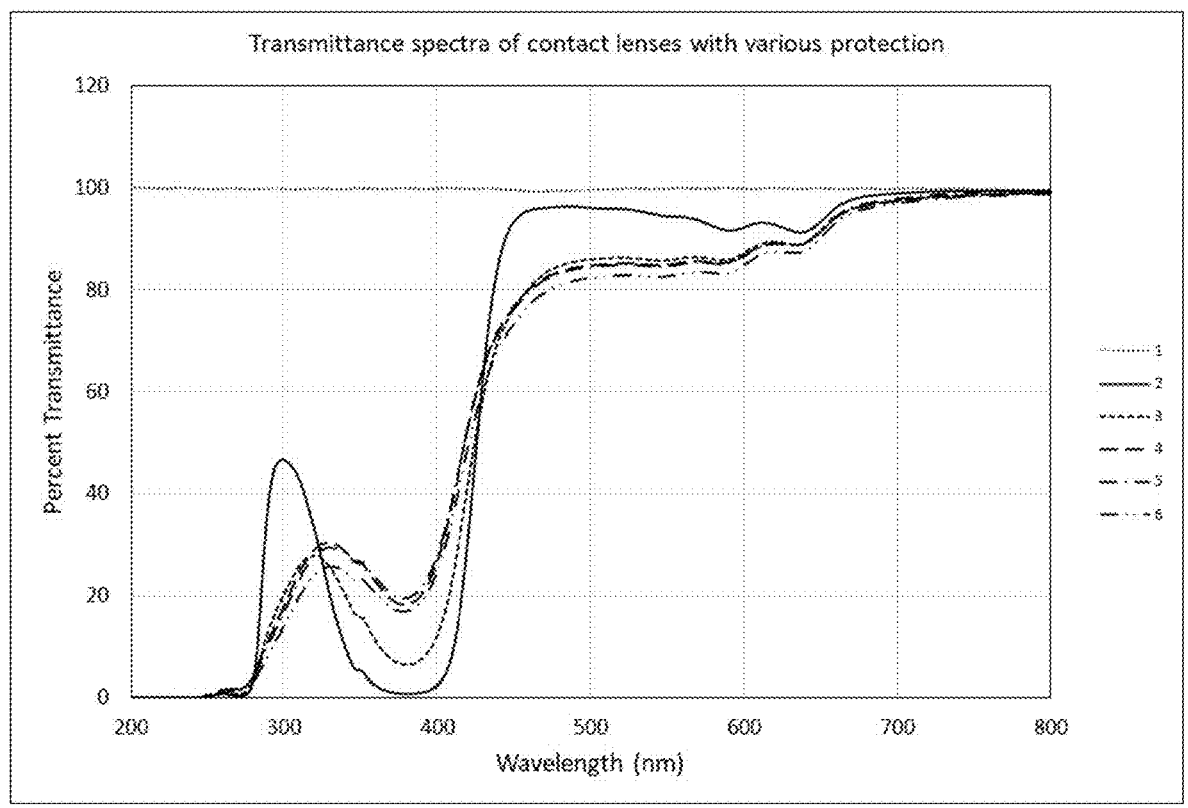
FIG. 7A shows UV/Vis spectral transmission curves of test lenses of Example 3 exposed to LED light, including those protected from photodegradation.
Figure 7B:
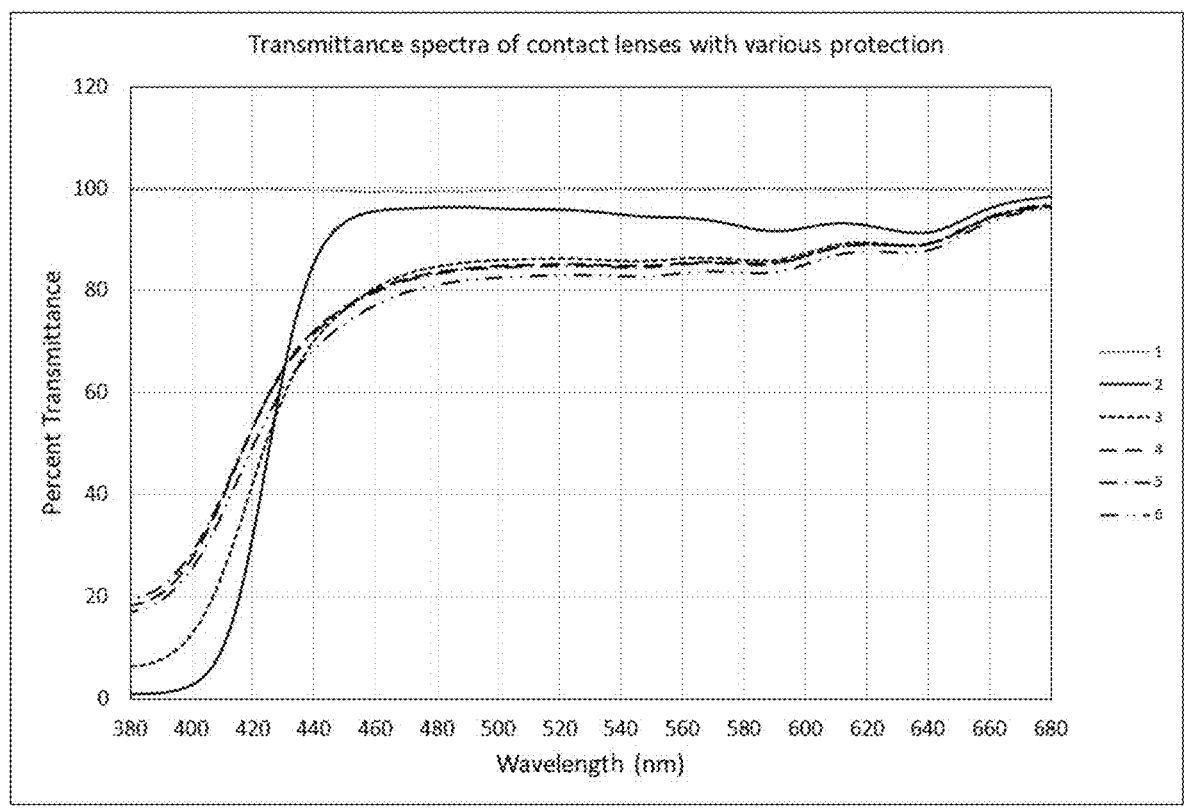
FIG. 7B is an expanded view of FIG. 7A, showing the transmission at 380 to 680 nm.

In FIG. 7A, curve 1 is the reference blank. Curve 2 is an unexposed test lens of Example 3. Curve 3 is a test lens exposed through a 2 mM LAC1 solution overlay. Curve 4 is a test lens exposed through a 0.5 mM LAC1 solution overlay. Curve 5 is a test lens exposed through a 0.1 mM LAC1 solution overlay. And curve 6 is a test lens exposed through a 0 mM LAC1 solution overlay (i.e., propylene glycol solvent only). FIG. 7B is an expanded view of FIG. 7A, showing the transmission at 380 to 680 nm.

As can be seen from FIGS. 7A and 7B, as the concentration of LAC1 is increased, less photodegradation of the lens, relative to an unexposed lens (curve 2), is observed. The difference in average transmission over a wavelength range of 400 to 450 nm between the exposed lenses relative to the unexposed lens is shown in Table 2. The average transmission of the unexposed lens over 400-450 nm is about 48%.

TABLE 2

| Overlay Solution | 400-450 nm average transmission | Ave transmission: diff from unexposed lens |
|---|---|---|
| 2 mM LAC1 | 48% | 0% |
| 0.5 mM LAC1 | 56% | 8% |
| 0.1 mM LAC1 | 56% | 8% |
| 0 mM LAC1* | 53% | 5% |

*Note:
the dish containing the propylene glycol solution above the lens had some condensation on top surface which may have scattered some light and resulted in some level of protection which may explain why the 0 mM propylene glycol solution provided more protection than the dilute LAC1 solutions. Moreover, the test method light intensity of 20 mW/cm$^2$ may have been too high for the more photosensitive compound 2-((1-ammo-8-oxo-5,6,7,8-tetrahydronaphthalen-2-yl)oxy)ethyl methacrylate which in turn may have affected the test method's sensitivity.

As demonstrated in Table 2, the LAC1 compound, which at least partially blocks the transmission of light at all of the wavelengths absorbed by the photosensitive chromophore of the test lens of Example 3, protects the compound from photodegradation. The greater the blocking by the LAC1

(resulting from its increased concentration in solution), the greater the protection afforded. The data suggests that the 2 mM LAC1 solution provides sufficient protection to preserve the average transmission level between 400 and 450 nanometers as the unexposed test lens.

We claim:

1. A contact lens system comprising:
a contact lens containing a photosensitive chromophore, the photosensitive chromophore having at least one active wavelength between 250 and 400 nanometers and at least one active wavelength between 400 and 450 nanometers; and
a package surrounding the contact lens, the package having a light transmittance of no more than 80 percent at each active wavelength,
wherein the contact lens containing the photosensitive chromophore exhibits at least a 2 percent change in its average transmission over a wavelength range of 400 to 450 nm after exposure to light under ICH guideline Q1B conditions.

2. The contact lens system of claim 1 wherein, at each active wavelength, the transmittance of the package is equal to or less than the transmittance of the photosensitive chromophore.

3. The contact lens system of claim 1 wherein the contact lens containing the photosensitive chromophore transmits: from 0 percent to 70 percent across a wavelength range of 400 to 409 nm.

4. The contact lens system of claim 1 wherein the contact lens containing the photosensitive chromophore transmits: from 10 percent to 95 percent across a wavelength range of 410 to 424 nm; at least 40 percent across a wavelength range of 425 to 449 nm; and at least 80 percent across a wavelength of 450 to 800 nm.

5. The contact lens system of claim 1 wherein the contact lens containing the photosensitive chromophore transmits: 45 percent or less across a wavelength range of 280 to 399 nm.

6. The contact lens system of claim 1 wherein the photosensitive chromophore is non-photochromic.

7. The contact lens system of claim 1 wherein the package is a primary package.

8. The contact lens system of claim 1 wherein the package is a secondary package.

9. The contact lens of claim 1 wherein the photosensitive chromophore comprises an alkoxy aniline derivative containing a polymerizable group or a tetrahydro-napthalenyl derivative containing a polymerizable group.

10. A contact lens system comprising:
a contact lens containing a photosensitive chromophore, the photosensitive chromophore having at least one active wavelength between 250 and 400 nanometers and at least one active wavelength between 400 and 450 nanometers; and
a package surrounding the contact lens, the package having a light transmittance of no more than 80 percent at each active wavelength,
wherein the photosensitive chromophore comprises an alkoxy aniline derivative containing a polymerizable group or a tetrahydro-napthalenyl derivative containing a polymerizable group.

11. The contact lens system of claim 10 wherein, at each active wavelength, the transmittance of the package is equal to or less than the transmittance of the photosensitive chromophore.

12. The contact lens system of claim 10 wherein the contact lens containing the photosensitive chromophore transmits: from 0 percent to 70 percent across a wavelength range of 400 to 409 nm.

13. The contact lens system of claim 10 wherein the contact lens containing the photosensitive chromophore transmits: from 10 percent to 95 percent across a wavelength range of 410 to 424 nm; at least 40 percent across a wavelength range of 425 to 449 nm; and at least 80 percent across a wavelength of 450 to 800 nm.

14. The contact lens system of claim 10 wherein the contact lens containing the photosensitive chromophore transmits: 45 percent or less across a wavelength range of 280 to 399 nm.

15. The contact lens system of claim 10 wherein the photosensitive chromophore is non-photochromic.

16. The contact lens system of claim 10 wherein the package is a primary package.

17. The contact lens system of claim 10 wherein the package is a secondary package.

18. The contact lens system of claim 10 wherein the contact lens containing the photosensitive chromophore exhibits at least a 2 percent change in its average transmission over a wavelength range of 400 to 450 nm after exposure to light under ICH guideline Q1B conditions.

* * * * *